United States Patent
Condon et al.

(10) Patent No.: US 6,655,413 B2
(45) Date of Patent: Dec. 2, 2003

(54) METHOD AND APPARATUS FOR PRESSURE TESTING PIPE LINES

(75) Inventors: Duane R. Condon, Ramona, CA (US); Thomas L. Kendall, San Marcos, CA (US); Larry D. Brown, San Diego, CA (US); Scott W. Randolph, Valley Center, CA (US); Dennis L. Hart, Newport Beach, CA (US)

(73) Assignee: Securus, Inc., San Marcos, CA (US)

( * ) Notice: Subject to any disclaimer, the term of this patent is extended or adjusted under 35 U.S.C. 154(b) by 80 days.

(21) Appl. No.: 09/832,917

(22) Filed: Apr. 11, 2001

(65) Prior Publication Data

US 2002/0148521 A1 Oct. 17, 2002

(51) Int. Cl.$^7$ ................................................. F16L 55/10
(52) U.S. Cl. .................... 138/94.3; 138/94; 251/326; 137/269
(58) Field of Search ..................... 138/94.3, 94, 94.5; 251/326–329; 137/269

(56) References Cited

U.S. PATENT DOCUMENTS

| | | | |
|---|---|---|---|
| 1,161,997 A | 11/1915 | Thompson | 251/297 X |
| 1,206,469 A | 11/1916 | Rockwell | 251/297 |
| 2,701,117 A | 2/1955 | Bashark | 251/174 |
| 2,845,954 A | * 8/1958 | Hamer | 138/94.5 |
| 3,051,201 A | 8/1962 | Wilson | 138/94.3 |
| 3,069,132 A | 12/1962 | Grove | 251/329 |
| 3,316,929 A | * 5/1967 | Milette | 137/270 |
| 3,333,814 A | 8/1967 | Sargent | 251/203 |
| 3,350,056 A | 10/1967 | Blumenkranz | 251/100 |
| 3,844,531 A | 10/1974 | Grengs | 251/327 |
| 3,860,038 A | 1/1975 | Forni | 138/94.3 |
| 3,945,604 A | 3/1976 | Clarkson | 251/174 |
| 4,007,911 A | 2/1977 | Clarkson | 251/233 |
| 4,112,969 A | 9/1978 | Still | 137/454 |
| 4,194,721 A | 3/1980 | Nachtigahl | 251/148 |
| 4,225,115 A | 9/1980 | Miller | 251/327 |
| 4,456,026 A | 6/1984 | Kantor | 137/315 |
| 4,479,670 A | 10/1984 | Gabler | 251/328 |
| 4,522,224 A | 6/1985 | Stalder et al. | 137/242 |
| 4,531,710 A | 7/1985 | Tort O. | 251/167 |
| 4,643,226 A | 2/1987 | Balz | 137/625.33 |
| 4,944,484 A | 7/1990 | Hostetler | 251/101 |
| 4,949,939 A | * 8/1990 | Almada | 251/328 |
| 5,004,210 A | 4/1991 | Sarno | 251/279 |
| 5,076,095 A | 12/1991 | Erhardt | 73/49.8 |
| 5,195,722 A | 3/1993 | Bedner | 251/199 |
| 5,445,359 A | 8/1995 | Beson | 251/159 |
| 5,524,663 A | 6/1996 | Walsh et al. | 137/15 |
| 5,653,423 A | * 8/1997 | Young et al. | 251/328 |
| 5,678,802 A | 10/1997 | Lunder | 251/294 |

FOREIGN PATENT DOCUMENTS

| | | |
|---|---|---|
| CH | 1610178 | 11/1990 |
| JP | 0055479 | 3/1989 |
| JP | 5099348 | 4/1993 |

* cited by examiner

*Primary Examiner*—Patrick Brinson
(74) *Attorney, Agent, or Firm*—Stetina Brunda Garred & Brucker

(57) ABSTRACT

A method and device for pressure testing a pipe line is provided wherein a fitting is inserted into the pipeline by inserting male ends of the pipeline into female ends of the fitting to define a flow path through the fitting extending along a longitudinal axis. The fitting has an internal boss extending around a circumference of the flow path and extending radially inward toward the centerline a distance corresponding to the wall thickness of the mating male ends of the pipes so the pipes and boss define a periphery of the flow path through the fitting. A recess is formed in the boss to sequentially receive two slides. An externally accessible port allows a test slide to be inserted into the recess, with the test slide sealing against the walls defining the recess to form a fluid-tight seal for pressure testing the line. The test slide is removed and a finish slide is inserted into the recess. The finish slide has an opening located and configured to coincide with the flow path through the male ends of the pipes, and to block the recess to provide a substantially uniform, cylindrical flow path through the fitting.

43 Claims, 13 Drawing Sheets

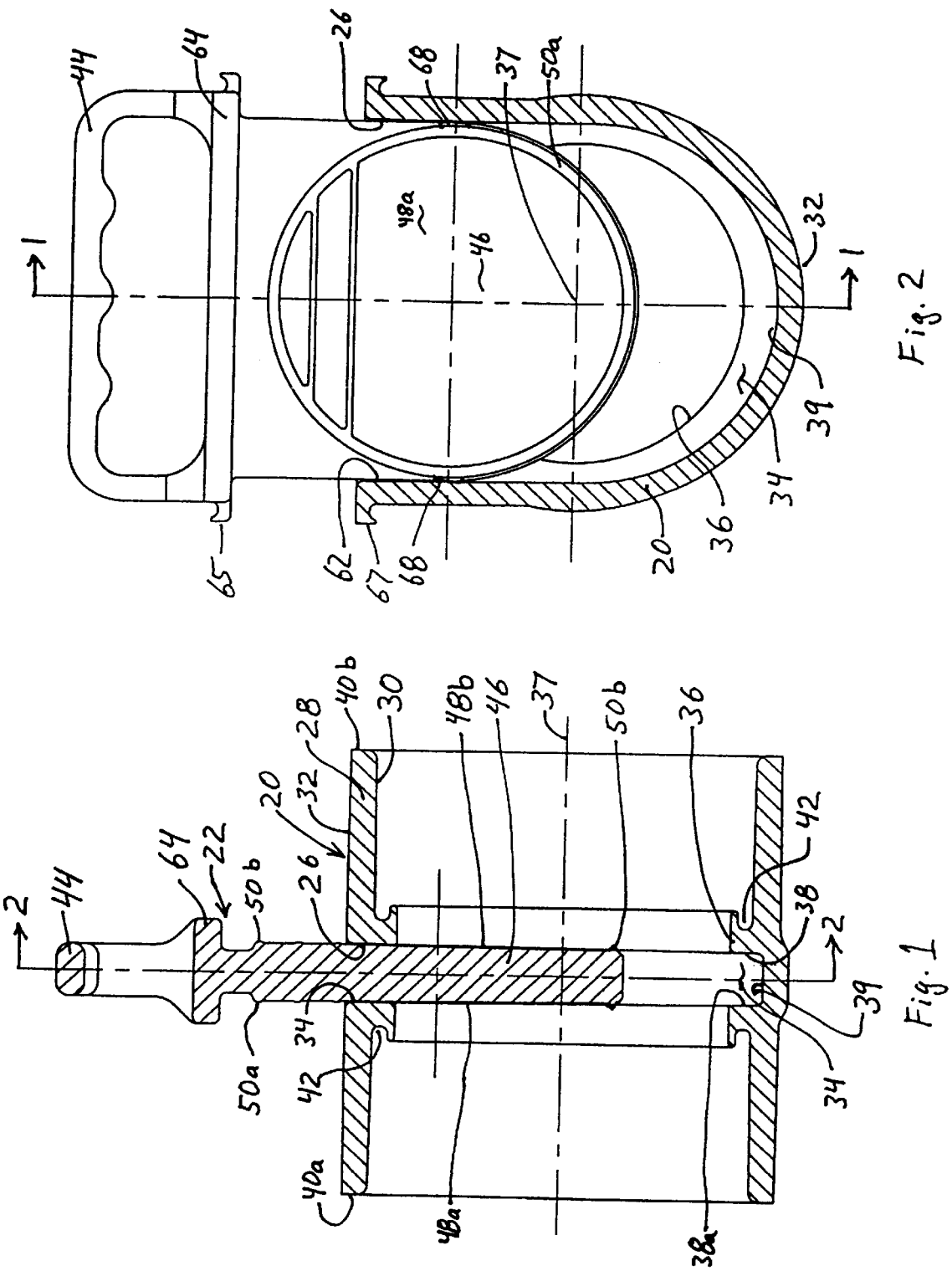

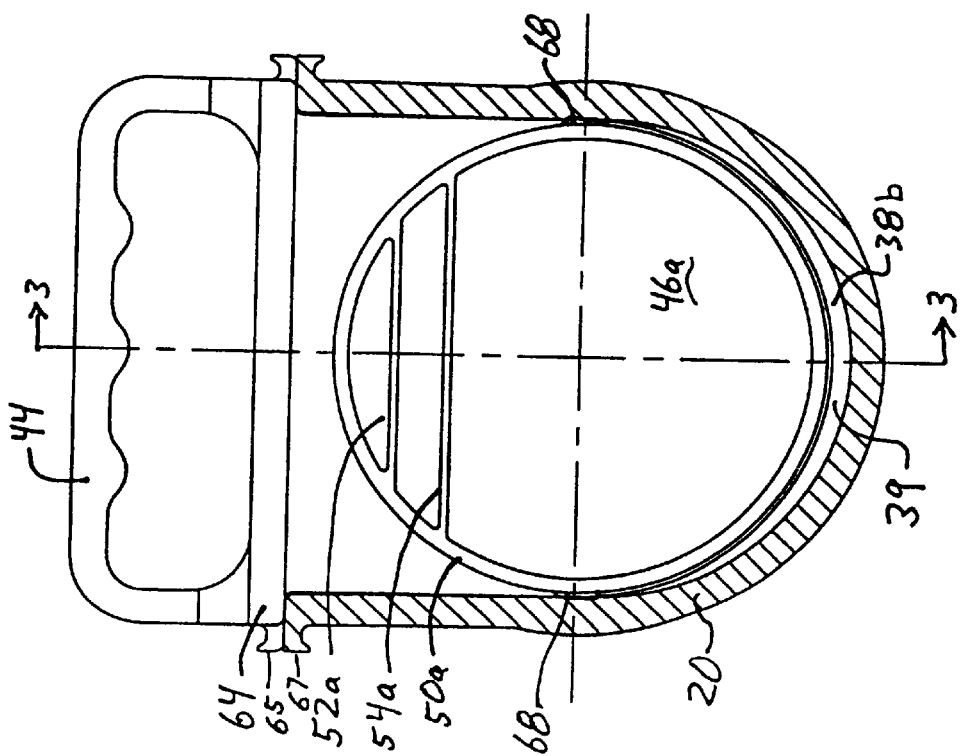
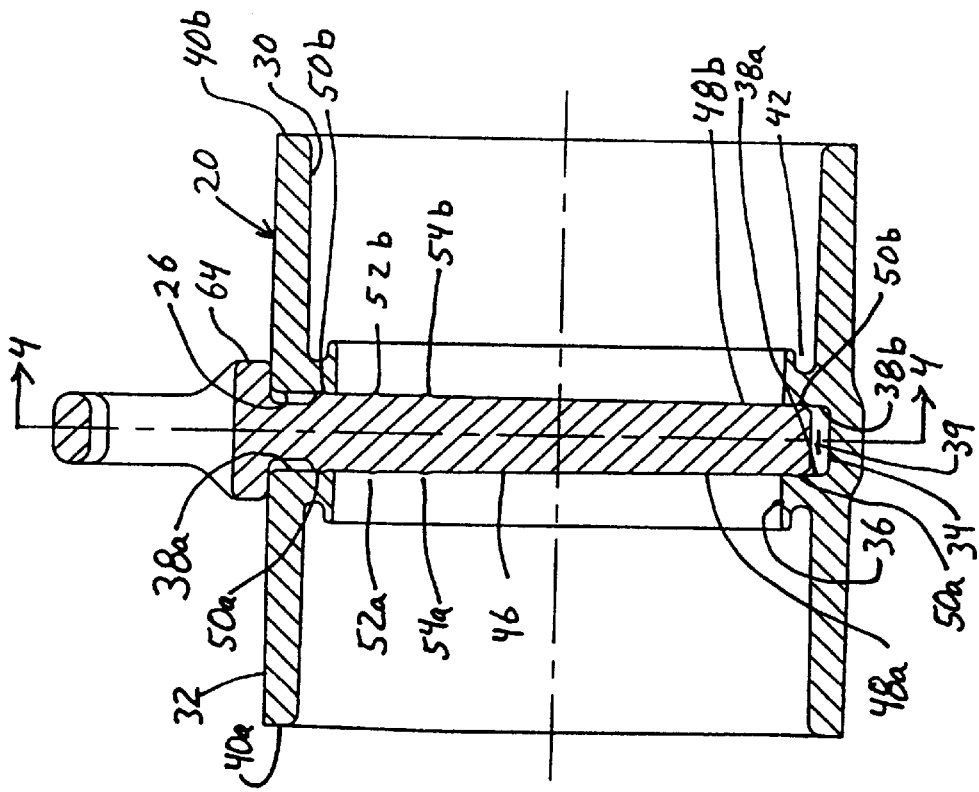

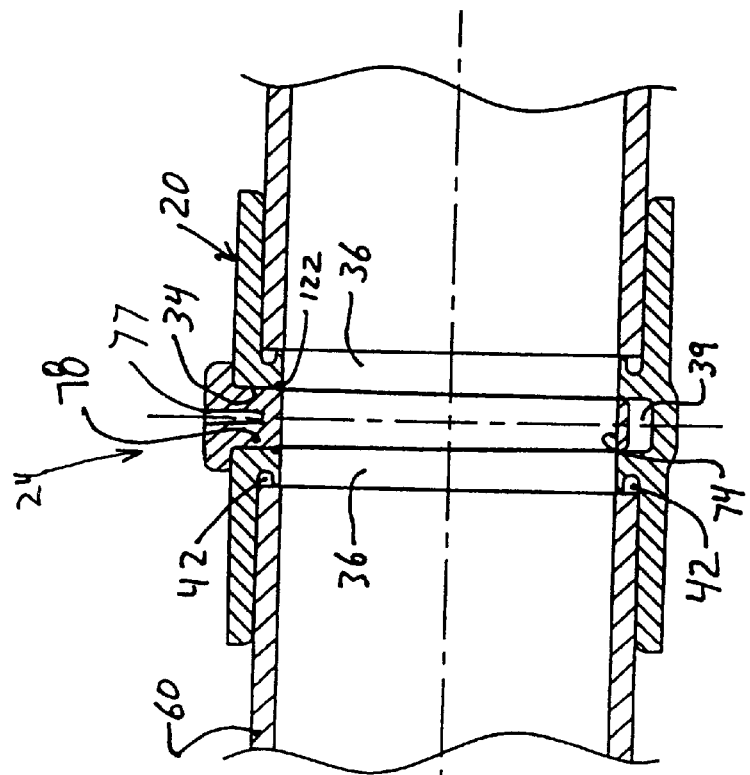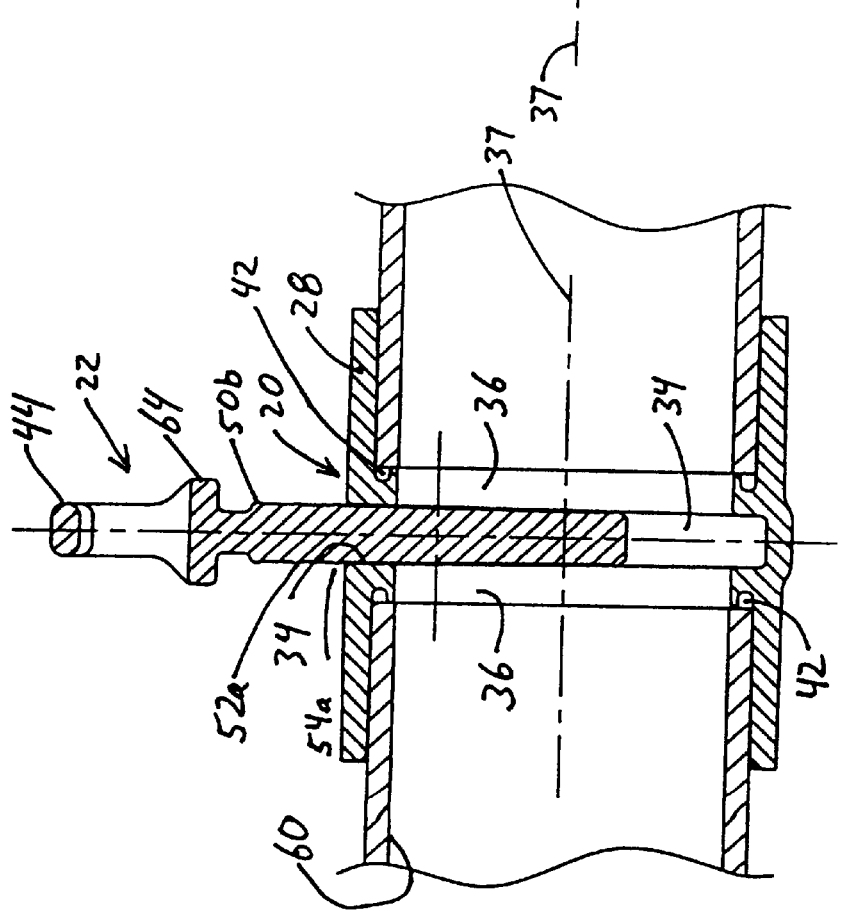

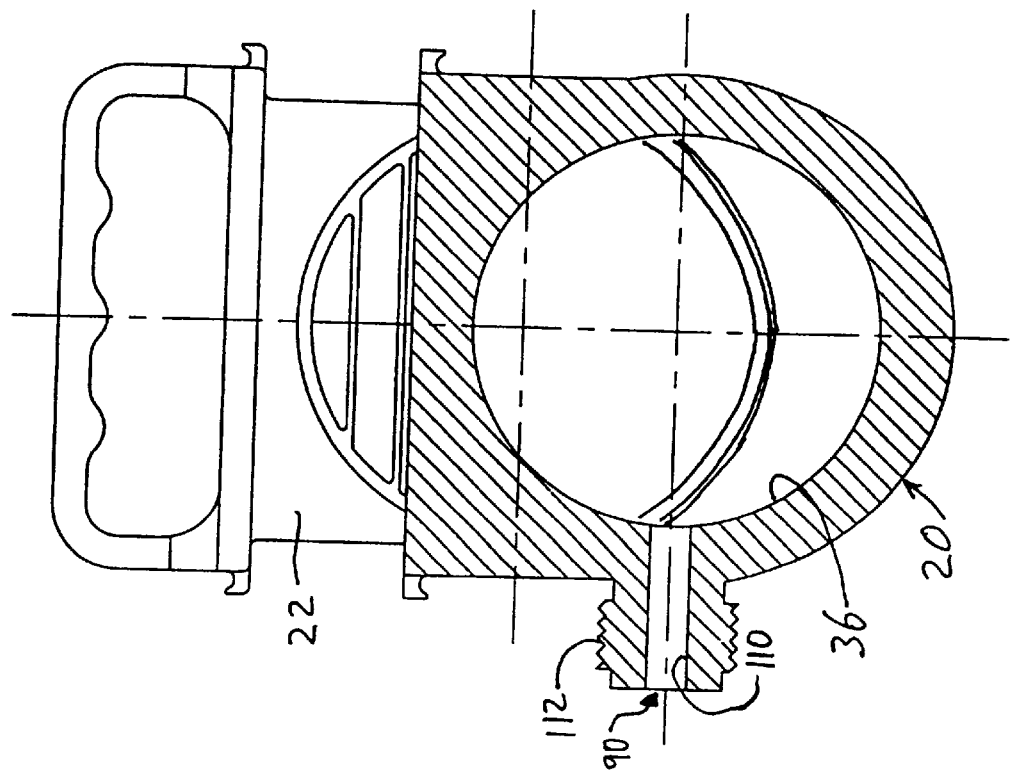
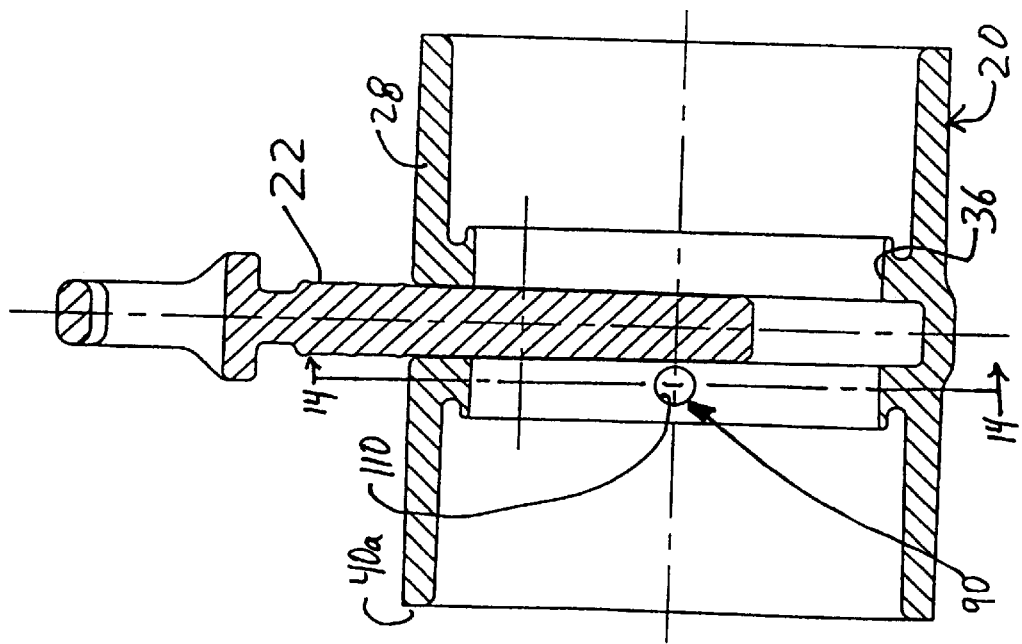

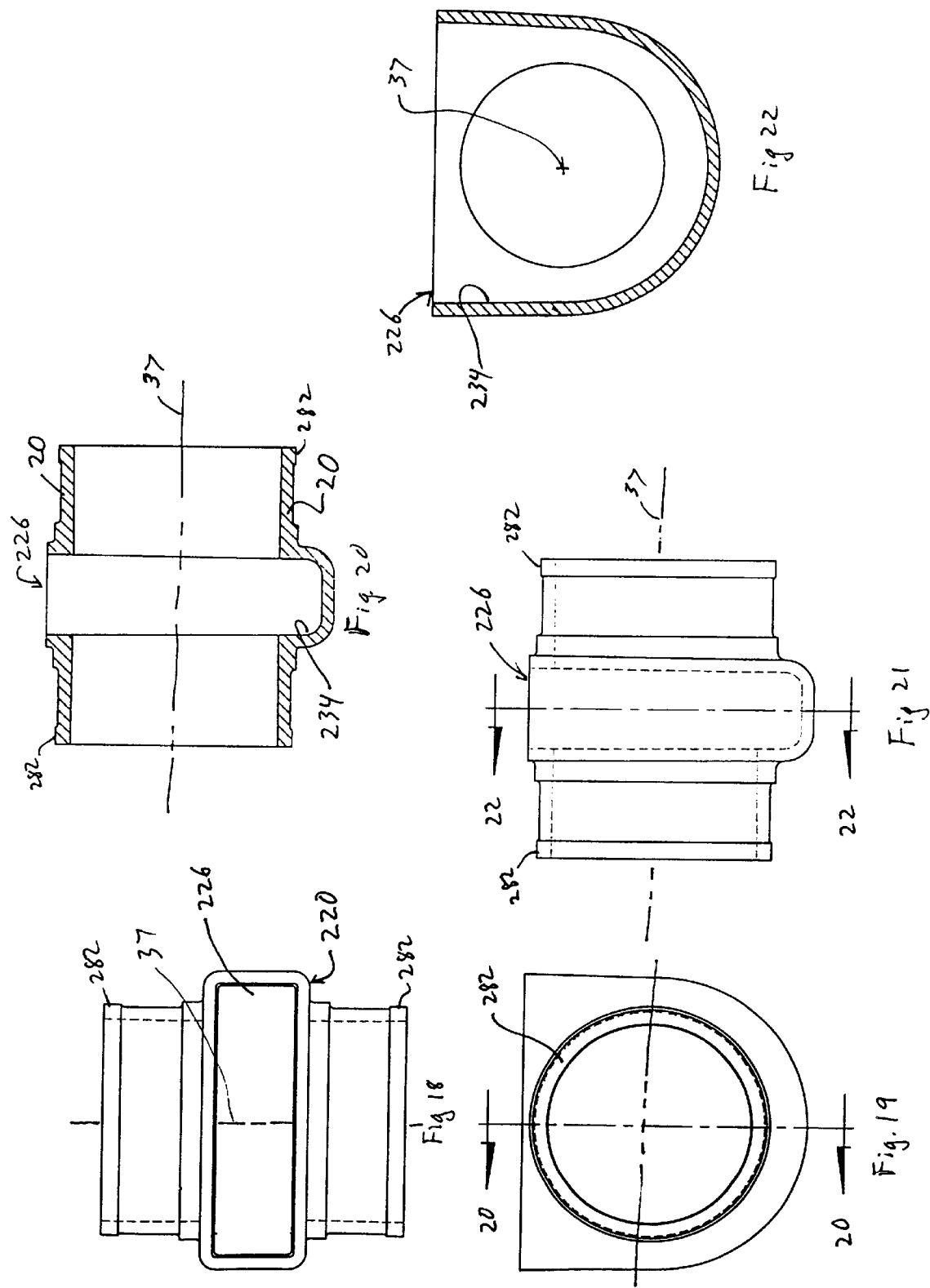

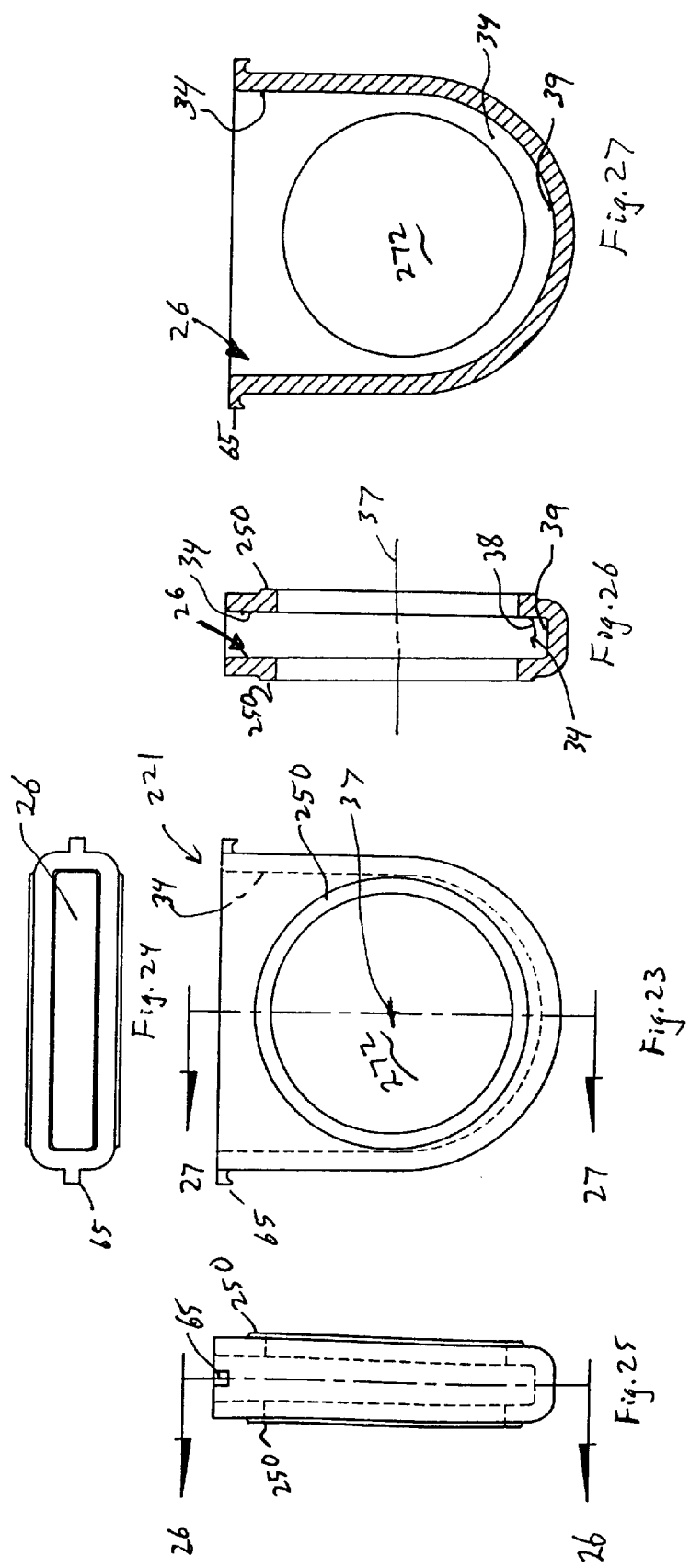

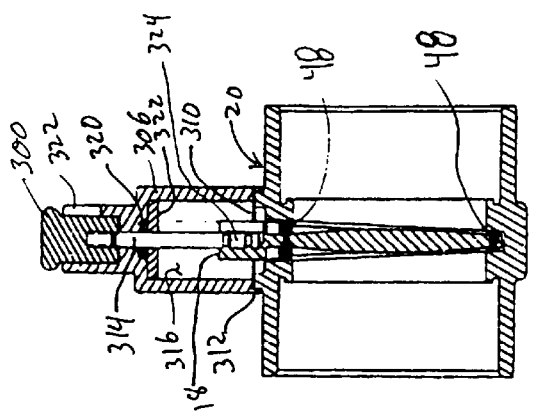
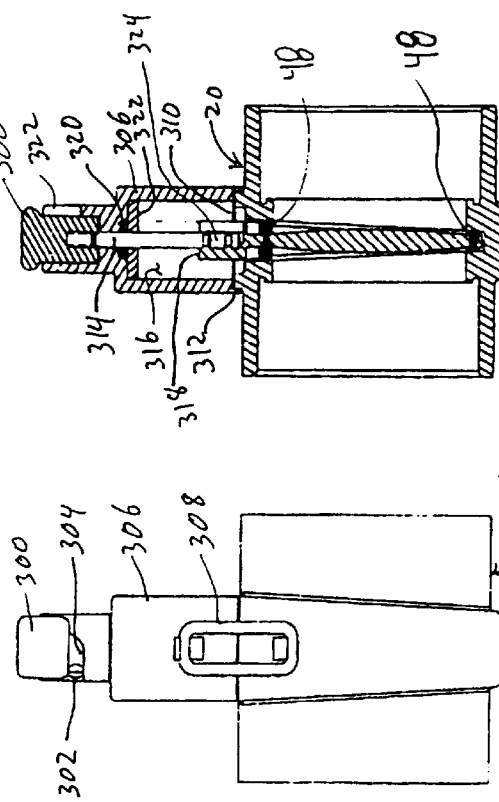
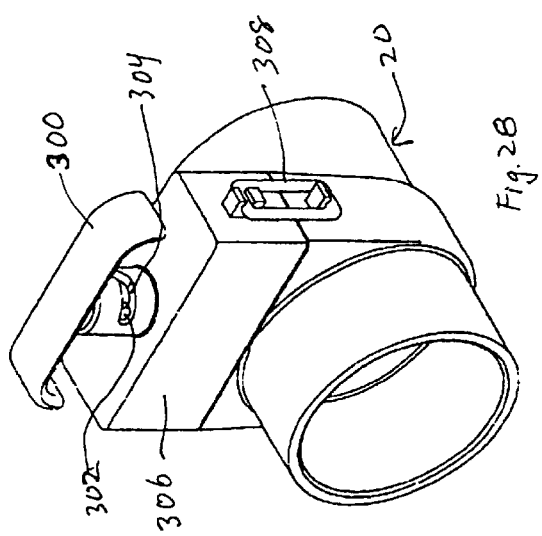
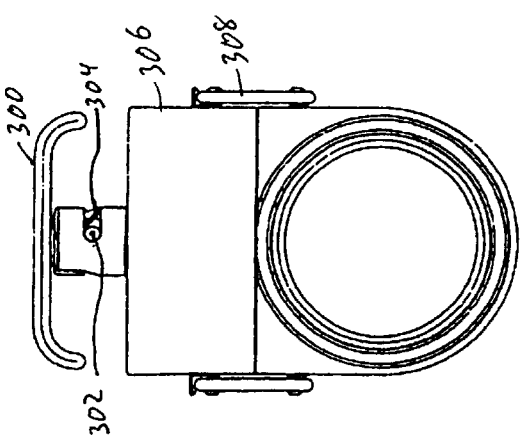

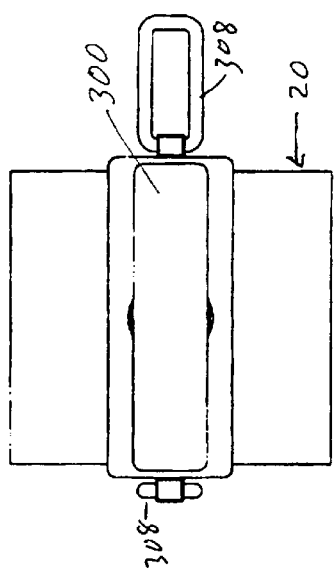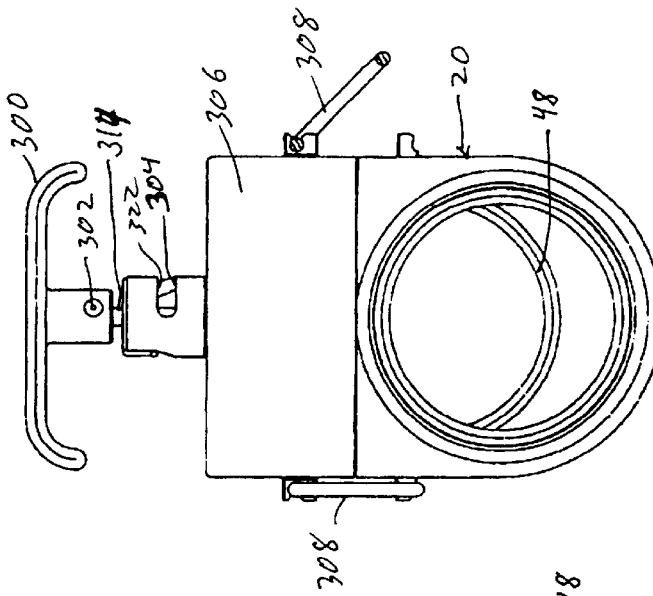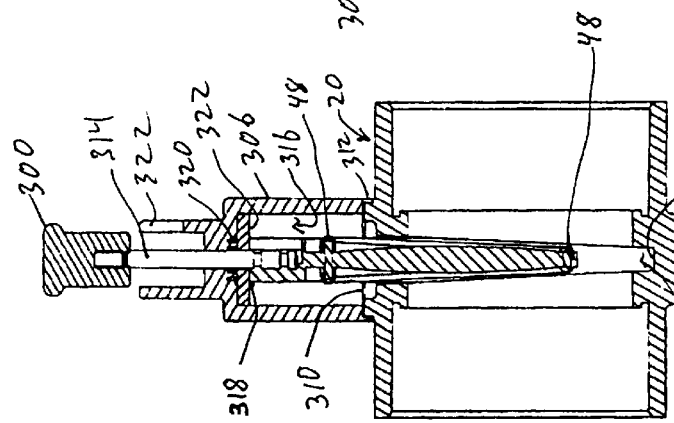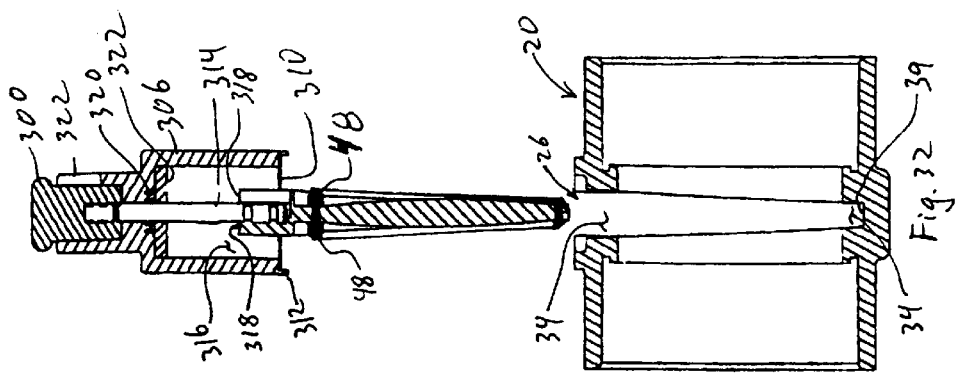

METHOD AND APPARATUS FOR PRESSURE TESTING PIPE LINES

BACKGROUND

Buildings and houses have pipe lines that need to be pressure tested in order to verify that the various joints in the pipe line do not leak. Such lines include water lines and drainage lines. This testing is typically done by hooking up a source of pressurized air or water to the line and filling the line. Because an open line will not hold the pressure for testing, the end(s) of each line must be capped or plugged prior to introducing the pressurized air or water. This is troublesome, and there is thus a need for an easier way to block the line for testing.

Further the line must frequently be tested in an intact state, after all joints have been fully assembled. If a single joint, or a series of joints are tested, this testing requires plugs to be introduced into the interior of the pipe via temporary openings which must be later closed and sealed. The current methods of achieving these temporary seals introduce significant and undesirable complications, including leaks, or spills. Moreover, several methods of temporarily sealing the line involve introducing inflatable balloon-like devices into the pipe via a fitting opening, inflating the balloon inside the line to seal the line for testing, and then removing the balloon and screwing a sealing cap into the opening through which the balloon was inserted. If the balloon is defective or over-inflated it can rupture and explode, with the potential for damage to the line or serious injury to the plumber. There is thus a need for a simpler, easier and safer way to temporarily block plumbing pipes for testing.

Moreover, current methods of introducing the pressurized fluid into the pipeline may require the plumber to do so from a location remote from the test and then return to the point of the test, or it may require two persons to accomplish the filling and testing. There is thus a need for a better way to pressurize and test lines, or portions of lines, by a single person at a single location.

SUMMARY

The above and other objectives are achieved by providing a method and apparatus for pressure testing a pipe line wherein a fitting is inserted into the pipeline by attaching ends of the pipeline, or intermediate adapters, to opposing sides of the fitting to define a flow path through the fitting extending along a longitudinal axis. Where it is intended that the fitting is to be attached by inserting pipe ends into the fitting, a female socket is provided for each of the two pipe ends. Preferably, an internal boss is provided that extends around a circumference of the flow path and extends radially inward toward a centerline of the fitting a distance corresponding to the wall thickness of the mating male ends of the pipes so the pipes and boss define a periphery of the flow path through the fitting. A recess is formed in the boss to sequentially receive two slides. The boss is optional, and the recess could be formed in the wall of the fitting. An externally accessible port allows a test slide to be inserted into the recess, with the test slide sealing against the walls defining the recess to form a fluid-tight seal for pressure testing the line. The test slide is removed after completion of the pressure testing, and a finish slide is inserted into the recess, again via the external port. The finish slide has an opening located and configured to coincide with the flow path through the male ends of the pipes, while the portion of the finish slide surrounding the opening blocks the recess and thus provides a substantially uniform, cylindrical flow path through the fitting. At the same time, the finish slide is configured to seal the external port against leakage.

There is thus advantageously provided a pressure testing kit for testing the pressure in a pipe line. The kit can include various parts, but preferably includes a main fitting having at least one end adapted to connect to an end of a pipe or another fitting, each of which will be referred to here as a pipe. This allows alignment of a fluid passage of the adjoined pipe with a fluid passage extending through the main fitting. The main fitting has formed therein a port opening on an exterior side of the fitting and aligned with a recess extending around a circumference of the fluid passage in the main fitting. A first test slide is sized and configured to be removably inserted into the port and recess to block the flow of fluid through the main fitting. This first test slide is preferably re-usable, and is thus preferably, but optionally, included in the kit. The kit also preferably, but optionally, includes a second finish slide that is sized and configured to be inserted into the port and recess. The finish slide has an opening there through corresponding in size and shape to the fluid passage through the main fitting, to allow flow through the finish slide and the main fitting when the finish slide has been inserted into the port and recess. Preferably, the first test slide is provided with a fluid passage having a first end opening onto a surface of the slide exterior to the main fitting when the slide is inserted into the port and a second end opening into the fluid passage of the main fitting when the slide is inserted into the port. The first end is in fluid communication with a fitting configured and sized to receive an end of a hose supplying the pressurized fluid, such as an air hose or a garden hose. Alternatively, the fluid passage could be formed in a side of the fitting rather than being formed in the slide.

The invention makes use of a finish slide to seal the port used for inserting the test slide, to block the recess and to provide an acceptable contour through the fitting for fluid flow. There is thus provided a finish slide sized to be sealingly received in a recess. The finish slide has walls defining an opening located and configured to substantially coincide with the fluid passage and to block the recess when the slide is inserted into the port and recess.

The finish slide can also comprise a slide body having walls defining a circular opening corresponding to a first diameter of the fitting. The walls have a length measured along the longitudinal axis corresponding to the first distance, so that when the finish slide is inserted through the port into the recess, the walls defining the opening cooperate with the walls on opposing sides of the recess to provide a fluid passage having a substantially uniform diameter over the length of the fitting as measured along the longitudinal axis. The finish slide preferably has a flanged end located a predetermined distance from the opening in the slide, the distance being selected so that when the flange engages a portion of the fitting the opening is aligned with the fluid passage preferably to achieve a desired minimum amount of interruption of the flow through the fluid passage.

There is thus advantageously provided sealing means for sealing the recess while providing a substantially unobstructed flow passage at the location of the recess, the sealing means being inserted into the recess through the port. There is further advantageously provided testing means insertable through the port, prior to installing the finish sealing means, for blocking the flow of fluid through the fluid passage sufficiently to allow pressure testing of the pipe line. The testing means preferably includes sealing means to prevent or inhibit the flow of pressurized fluid through the port in the side of the fitting even as the testing means is partially removed from a position fully blocking the flow of fluid through the fitting. Further, a fill port preferably extends from outside the fitting to the fluid passage passing through the inside of the fitting and having a coupling adapted to connect to a source of pressurized fluid to pressurize the pipe line for testing. The fill port can be located on the testing slide, or on a side of the fitting.

There is also advantageously provided a method for use in pressure testing a pipe line. The method connects a pipe fitting having a fluid passage extending there through with an at least one end of the pipe line. The fitting has an externally accessible port. A first slide having opposing faces is inserted through the port into the fitting to engage a sealing surface on at least one face of the slide with a surface in the fluid passage. The slide is sized and configured and the sealing surfaces are located to block the fluid passage sufficiently to allow pressure testing of the pipe line. The pipe line is then pressure tested, the first slide removed, and a second slide inserted through the port into the fitting.

The second slide has an opening there through defined by walls, with the opening being sized and located so the walls form a portion of the fluid passage when the slide has been inserted into the fitting. Advantageously, the second slide is either permanently or securely but removably fastened to the fitting in a later operation. Further, the first slide is preferably provided with a fluid passage having a first end externally accessible and a second end in fluid communication with the fluid passage of the fitting so that fluid can be introduced from an external source through the fluid passage of the first slide and into the fluid passage of the fitting. Moreover, where the fitting is used with male pipe ends, the fitting is preferably provided with an internal boss around a circumference of the fluid passage so the boss extends radially inward toward the centerline, where the recess is preferably, but optionally, formed in the boss. The fitting is thus preferably connected to the pipe line by providing opposing ends of the fitting with female ends and inserting mating male ends of the pipeline into the female ends so the male ends abut the boss. The boss and male ends provide a substantially uniform diameter to the fluid passage through the fitting.

This invention is advantageously achieved by providing a kit for testing the pressure in a pipe line. The kit includes a main fitting having at least one end adapted to connect to an end of a pipe and align a fluid passage of the pipe with a fluid passage extending through the main fitting. The main fitting has a port opening on an exterior side of the fitting and aligned with a recess extending around an interior circumference of the fluid passage in the main fitting. The kit preferably includes a first test slide sized and configured to be removably inserted through the port and into the recess to block the flow of fluid through the main fitting. The kit also preferably includes a second finish slide sized and configured to be inserted into the port and recess to seal the port. The kit could include the fitting and test slide, the fitting and finish slide, or the fitting and both slides.

Preferably, the finish slide has an opening corresponding in size and shape to the fluid passage through the main fitting to allow flow through the finish slide when it has been inserted into the fitting, while providing a relatively uniform flow surface across both the finish slide opening and immediately adjacent portions of the main fitting. The test slide preferably has at least one lateral seal extending perpendicular to the direction of travel of the test slide as it is removed from the port, said lateral seal cooperating with the walls which define the port, for at least a portion of the test slide travel, in order to seal against fluid passage through the port from the interior of the fitting. Advantageously, the port has a rectangular cross-section, and so does the test slide. Advantageously, the test slide further has an edge around its periphery, with a seal located on the edge to engage a radially outward wall forming a portion of the recess and port. Moreover, both the test slide and finish slides are preferably tapered toward their distal end, with the distal end being that portion that enters the recess opposite the port. Advantageously, the main fitting has a pressurizing connection sized and configured to connect to a fluid source with the pressurizing connection being in fluid communication with the fluid passage of the main fitting.

It is preferred, but not required, that the fluid passage of the fitting have a boss extending toward a longitudinal centerline of the fitting, with the recess being formed in the boss. Further, the boss preferably has at least one side wall extending perpendicular to the longitudinal axis, with a recess therein extending around a circumference of the flow path to receive expressed adhesive when pipes are inserted into the fitting and urged toward the boss.

This invention also comprises a method for use in pressure testing a pipe line. The method connects at least one end of a pipe fitting having a fluid passage there through to a pipe line to define a fluid flow path along a longitudinal axis. The fitting is provided with an externally accessible port. The first slide has opposing faces and is inserted through the port into the fitting to engage a sealing surface on at least one face of the slide with a surface in the fluid passage. The first slide is sized and configured and the sealing surfaces are located to block the fluid passage sufficiently to allow pressure testing of the pipe line. The pipe line is then pressure tested. The first slide is removed and a second slide is inserted through the port into the fitting to seal the port with the second slide. The second slide is configured so it seals the port but does not block flow through the fluid passage of the fitting. The port is then sealed against fluid flow out of the port, preferably by gluing the second slide to the port.

Advantageously, the method includes providing the fitting with a recess extending about a circumference of the flow path, with the first slide extending into the recess around the entire circumference to block the flow path. Moreover, the second slide preferably has an opening there through defined by walls, with this opening being sized and located to cooperate with the recess to block the recess and form a portion of the fluid passage when the second slide seals the port. Further, while the pressure for testing can be provided any where along the pipe line, it is advantageously provided through the fitting. The method thus preferably provides a fluid passage extending from outside to the inside of the fitting, with the fluid passage having a first end accessible externally of the fitting and having a second end in fluid communication with the fluid passage of the fitting so that fluid can be introduced from an external source into the fluid passage inside the fitting. Advantageously the fluid passage extends through the first slide, or alternatively the fluid passage extends through a wall of the fitting.

Advantageously the method provides the fitting with an internal boss around a circumference of the fluid passage so the boss extends radially inward toward the longitudinal axis and forms a recess in the boss. Further, the fitting is advantageously connected to the pipe line by providing opposing ends of the fitting with female ends and inserting mating male ends of the pipeline into the female ends so the male ends abut the boss, the boss and male ends providing a substantially uniform diameter to the fluid passage through the fitting. Moreover, a recess is advantageously formed in a side wall of the boss, said recess extending around a circumference of the flow path and configured to receive excess adhesive when a male end of the pipe line is urged toward the boss.

The method also preferably includes providing a circular sealing surface on at least one face of the first slide and further providing at least one lateral sealing surface forming a chord or chords on the circular sealing surface. The lateral sealing surfaces are located on the slide to engage walls defining the port to seal against the passage of fluid across the lateral seals when the first slide is partially removed from the port. The method also includes forming at least a portion of the recess larger than the first slide to define a debris trap between the fitting and a portion of the first slide. Moreover, the fitting is preferably made of a thermoplastic polymer (e.g., ABS, PVC, etc.) and adhered to the pipe line using an adhesive. The first slide is advantageously made of a material different in composition, and also preferably (but optionally) different in color, from the fitting and selected so the adhesive does not adhere to the first slide. In contrast, the second slide is preferably made of a material selected to be adhered to the fitting.

Further, the method and apparatus advantageously comprises placing an insert into the pipe fitting, with the insert defining the port through which the test and finish slides are inserted. This is especially useful for allowing test slides of one material, such as plastics, to be used with pipe fittings of a very different material, such as metal, e.g., cast iron. The insert further defines the recess extending about a circumference of the flow path into which the test slide and finish slides are inserted. Additionally, a cap can be provided to be placed over the first slide to allow partial opening of the fluid passage while preventing leakage of the pressurized fluid from the cap as the first slide is partially removed through the port and partially removing the first slide through the port and into the cap after pressure testing in order to relieve pressure in the pipe line. The cap has a cavity through which a shaft extends. One end of the shaft is connected to a handle and another end is connected to the test slide. A limit lock on one or more of the shaft, test slide and cap limits movement of the test slide to relieve pressure in the pipe line after pressure testing. Seals are provided around the cap and shaft to maintain pressure during testing.

DETAILED DESCRIPTION OF THE DRAWINGS

Further features and advantages of the invention will be better understood by reference to the following detailed description and drawings in which like numbers refer to like parts throughout, and in which:

FIG. 1 shows a side, sectional view of a fitting and test slide of this invention taken along Section 1—1 of FIG. 2;

FIG. 2 shows a cross-sectional view of the fitting and test slide of FIG. 1, taken along Section 2—2 of FIG. 1;

FIG. 3 shows a side, sectional view of the invention of FIG. 1 with a test slide fully installed, taken along Section 3—3 of FIG. 4;

FIG. 4 shows a cross-sectional view of the invention of FIG. 3, taken along Section 4—4 of FIG. 3;

FIG. 5 shows a cross sectional view of the invention of FIG. 1 connected to a pipe line;

FIG. 6 shows a cross sectional view like that of FIG. 7 but with the fitting of FIG. 1, connected to a pipe line;

FIG. 13 shows a longitudinal cross section of a further embodiment of this invention;

FIG. 14 shows a cross-section along section 14—14 of FIG. 13;

FIG. 18 is a top view of a further embodiment of a fitting of this invention;

FIG. 19 is an end view of the fitting of FIG. 18;

FIG. 20 is a sectional view taken along section 20—20 of FIG. 19;

FIG. 21 is a side view of the fitting of FIGS. 18 and 19;

FIG. 22 is a sectional view taken along section 22—22 of FIG. 21;

FIG. 23 is an end view of an insert for the fitting of FIG. 18;

FIG. 24 is a top view of the insert of FIG. 23;

FIG. 25 is a side view of the insert of FIG. 23;

FIG. 26 is a sectional view taken along section 26—26 of FIG. 25;

FIG. 27 is a sectional view taken along section 27—27 of FIG. 23;

FIG. 28 is a perspective view of a further embodiment of the fitting and a test slide of this invention;

FIG. 29 is a front view of the embodiment of FIG. 28;

FIG. 30 is a side view of the embodiment of FIG. 28;

FIG. 31 is a cross sectional view of the embodiment of FIG. 28 with the test slide inserted;

FIG. 32 is an exploded sectional view of the embodiment of FIG. 28 with the test slide removed;

FIG. 33 is a cross sectional view of the embodiment of FIG. 28 with the test slide partially inserted;

FIG. 34 is an end view of FIG. 33; and

FIG. 35 is a top view of FIG. 34.

DETAILED DESCRIPTION

Figure 8:
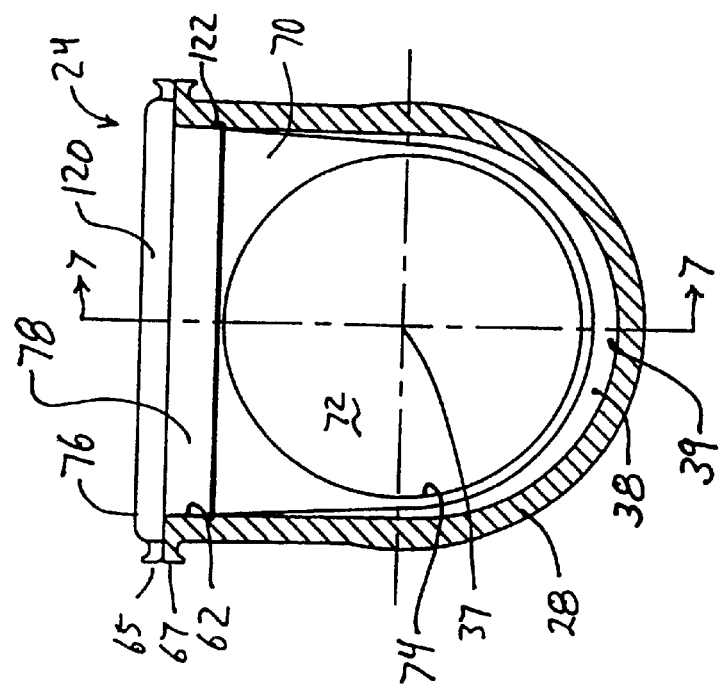
FIG. 8 shows a cross-sections view of FIG. 7, taken along Section 8—8 of FIG. 7.

Referring to FIGS. 1–5, 7 and 9–10, a main fitting 20 is provided for insertion into a pipe line, such as the water line of a house or building, or a sewage drain system, so as to allow fluid to flow through the fitting 20 and the line. The fitting 20 is shown as a straight fitting with a longitudinal axis there through, but the fitting could be of various shapes and types, including a Y-fitting, a clean out fitting, an elbow fitting, a reducing fitting, or an enlarging fitting. A first slide, referred to here as a test slide 22, can be removably inserted into the fitting 20 to provide a fluid tight seal with mating surfaces of the fitting 20 to allow pressure testing of the drain system upstream of the test slide 22. After testing is completed, the test slide is removed and a second slide, referred to here as finish slide 24 (FIG. 7), is then inserted into the fitting 20 and secured to the fitting in order to prevent fluid from escaping the fitting 20, and preferably but optionally, to also provide a preconfigured flow surface on the inside of the fitting. The preconfigured flow surface is preferably shaped so that the interior flow passage of the fitting reduces the collection of debris from the fluid flowing through the fitting during use of the plumbing line. Advantageously it provides a substantially continuous surface with no substantial recesses, cavities or protrusions, and especially provides a surface lacking such discontinuities as would be prohibited under plumbing codes for such pipe lines.

The fitting 20 has an opening or port 26 configured to sealingly receive test slide 22. The port 26 can have various shapes, but is shown with a rectangular opening or port 26 that extends through a wall 28 of the main fitting 20. The wall 28 has an exterior side 32 and an interior side 30 that are generally parallel and typically form a tube. The port can be at various locations and orientations, but is described here as being located on the top side of the fitting, where top or the upward direction refers to a direction away from the ground while the bottom or downward direction refers to a direction toward the ground.

The port 26 opens into a recess 34 that extends around an inner circumference of the interior wall 30. The recess 34 is preferably formed partially in wall 28 and partially in a boss 36 extending radially inward from the interior walls 30 toward centerline 37. The recess 34 could be formed entirely in either part. The recess 34 can have various shapes, but is shown as having a rectangular cross-sectional shape with opposing and generally parallel walls 38a, 38b. The recess forms a groove in the inside walls of the fitting 20 extending away from the longitudinal axis 37, but opening toward the axis 37. When viewed along the longitudinal axis 37, the juncture of the recess 34 and the port 26 can be thought of as a circular recess 34 encircling the flow path, joined to a port 26 having a rectangular shape with a semi-circular cut-out at the location of the flow path and recess. When viewed along the path followed by the slides 22, 24 when they are inserted and removed, the rectangular-cross-sectioned port 26 has its smaller edges extending straight to a plane through the longitudinal axis 37 which plane is perpendicular to the path that the slides 22, 24 travel.

The recess 34 can be centered about centerline 37, but is preferably offset slightly in a direction away from port 26 so that it extends slightly further into the wall 28 opposite the port in order to form a crescent shaped trap 39 to allow debris to collect in that portion of the recess. The trap 39 is formed by the space between the periphery of the test slide 22 and a radially outward wall defining the recess 34. Various shapes can be used for the trap 39, but offsetting the recess 34 from the centerline of the fitting 20 allows easy manufacture while providing a trap 39. The trap 39 is greater in size than any tolerances formed by manufacturing tolerances, misalignment tolerances and mis-fit tolerances. Advantageously it is about 1/32 of an inch or more greater than the accumulated tolerances mentioned above.

If the intended orientation of the fitting 20 during use does not have the port 26 vertically upward, then the location of the trap 39 can in some instances be changed so that it is in the lower portion of the fitting 20 to allow gravity to urge debris into the trap 39. If the port 26 is located downward, then the trap 39 can be omitted. If the longitudinal axis of fitting 20 is vertical, then the trap location may not matter much. While the trap can be omitted entirely even with the port 26 located vertically, it is preferably included in order to ensure the slides 22, 24 fit into the recess 34. The fitting 20 has opposing ends 40a, 40b. Preferably, but optionally, the opposing sides of the fitting adjacent to ends 40a, 40b each has a recess 42 to receive adhesive, as discussed later.

The test slide 22 is inserted into the port 26 to seal the fitting 20 for pressure testing of the plumbing line. The test slide 22 has an exterior end forming a handle 44 adapted to be grasped by a tool or hand to insert the slide 22 into and pull it out of port 26. FIGS. 2 and 4 show one example of a handle configured to allow fingers to be inserted through the handle and gripped to move the test slide 22.

The test slide 22 has a slide body 46 configured to block the flow passage through fitting 20, preferably so that no fluid passes the slide 22, and at least sufficient to allow pressure testing of the pipe line. Advantageously, the test slide 22 is of a different color than the fitting 20 in order to indicate that the test slide is in use. The test slide body 46 has opposing and generally parallel side faces 48a, 48b. The slide body 46 has seals located and configured to provide a fluid tight seal with fitting 20, preferably through cooperative sealing surfaces located in recess 34. Various seal types, locations and configurations can be used to achieve the sealing requirements. Preferably the seals prevent all leakage, although the testing requirements may vary and occasionally allow some small amount of leakage.

Referring to FIG. 1, circular sealing surfaces 50a, 50b are advantageously provided on each of seal faces 48a, 48b. Advantageously the sealing surfaces 50 are formed integrally with the test slide 22, and are preferably molded simultaneously with the formation of the slide 22. When the test slide 22 is inserted completely into the fitting 20, the sealing surfaces 50 abut opposing side walls 38a, 38b of recess 34 to form a circular seal around the entire circumference of fitting 20. This prevents fluid from leaking past the test slide 22 when the slide is fully inserted into the recess 34.

There are preferably two, opposing sealing surfaces 50a, 50b, located on opposing sides of slide 22. That allows the test slide 22 to be bi-laterally symmetric so that it can be inserted into the port 24 in either orientation and still seal well. If only one sealing surface 50 is used, the sealing surface is preferably on the downstream side of the slide body 46. The sealing surfaces 50 could be formed on the walls 38a, 38b of recess 34 in boss 36. The sealing surfaces 50 could also comprise discrete O-ring seals seated in recesses formed in the slide faces 46a, 46b, or formed in the walls 38a, 38b of the recess 34.

The opposing walls 38 and the opposing faces 46 were previously described as being generally parallel. The walls 38 and/or the faces 46 can be slightly tapered so that the insertion of the test slide 22 wedges the slide body 46 into the recess 34 to form a seal around the circumference of the fitting 20. Alternatively, the planes containing sealing surfaces 50 could be tapered to accomplish the same sealing result. This wedging effect to increase the sealing force is preferably used with sealing surfaces 50, but could be used without the presence of surfaces 50.

The circumferential sealing surface 50 prevents leakage around the circumference of the fitting 20 when the test slide 22 is completely inserted into the fitting 20 and engages the entire periphery of recess 34. Advantageously there are additional seals to protect against, or reduce, leakage out the port 26 when the test slide 22 is only partially inserted in to the fitting 20. In particular, after pressure testing, when the test slide 22 is first withdrawn there is a possibility that high pressure remaining from the testing can force fluid out the port 26 after the sealing surface 50 is broken by disengaging a portion of the test slide 22 from the recess 50.

Advantageously, but optionally, one or more lateral sealing surfaces 52 interposed between the port 26 and slide 22 are provided to seal against leakage out port 26 when the test slide 22 is partially removed from the port 26. A first lateral sealing surface 52 extends laterally, perpendicular to the direction of movement of the test slide 22 as it is removed from port 26. The sealing surface 52 extends between opposing portions of circular sealing surface 50, and forms a chord of that circular sealing surface 52. The sealing surface 52 is preferably, but optionally, formed on opposing sides of test slide 22 so there are shown lateral sealing surfaces 52a, 52b.

Figure 17:
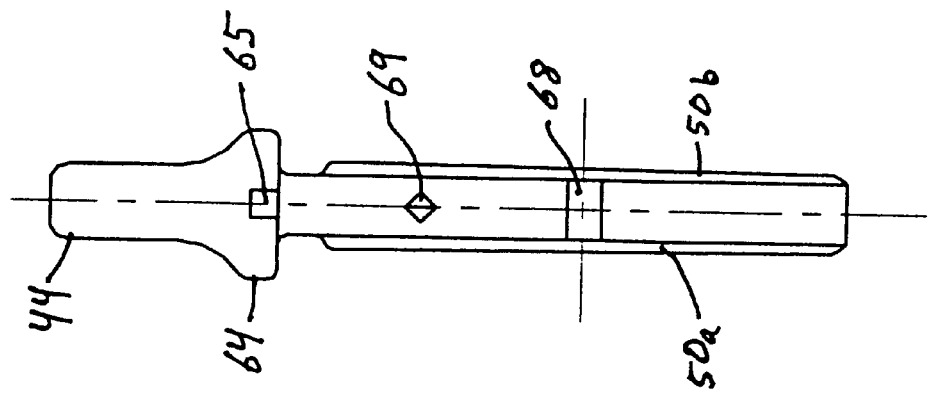
FIG. 17 shows a side view of the test slide of FIG. 16;.
Figure 16:
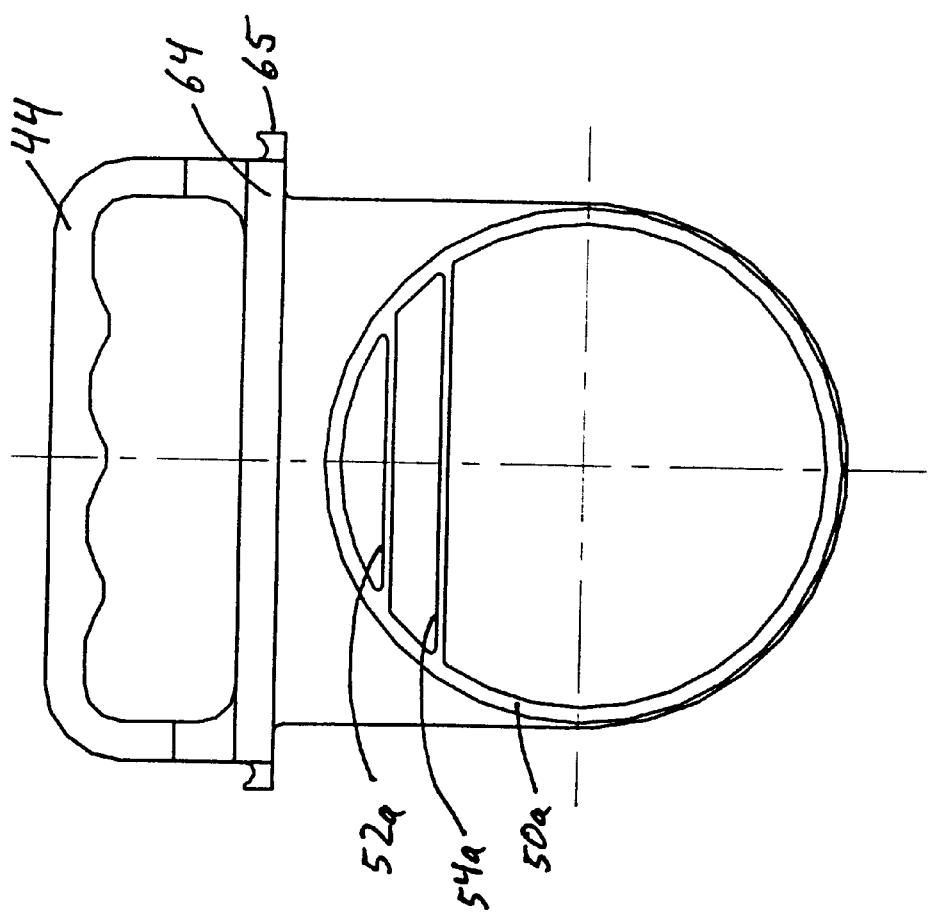
FIG. 16 shows a front view of an alternative embodiment of a test slide of this invention.

Advantageously, a visually perceptible indicator 69 (FIG. 17) is either marked or molded into at least one edge of the slide 22 to provide a visual indication of when the sealing surface(s) 52a, 52b engage or disengage the face of port 26, or are about to engage or disengage the face of port 26. The indicators 69 preferably appear on opposing edges of the slide 22 at corresponding locations on the slide. The indicators 69 could be formed on a metal or strengthened insert over which the body of the test slide 22 is over-molded so as to leave the indicator visible. Preferably, the indicator 69 and the surrounding portions of the slide 22 are made of different colored materials so that a visual inspection can readily indicate the position of the test slide.

A second lateral sealing surface 54 extends laterally, perpendicular to the direction of movement of the test slide 22 as it is removed from port 26. The sealing surface 54 extends between opposing portions of circular sealing surface 50, and forms a chord of that circular sealing surface 52. The sealing surface 54 is located radially inward of the sealing surface 52, and thus has a longer length than sealing surface 52. The sealing surface 54 is preferably, but optionally, formed on opposing sides of test slide 22 so there are shown lateral sealing surfaces 54a, 54b. Thus, the sealing surfaces 50, 52, 54 comprise a circular sealing surface 50 with one or more chord sealing surfaces 52, 54. Advantageously, a visually perceptible indicator 69b is either marked or molded into the edge of the slide 22 to provide a visual indication of when the sealing surface(s) 54a, 54b engage or disengage the face of port 26.

The lateral sealing surfaces 52, 54 are preferably integrally molded with the test slide 22. As shown in FIGS. 2 and 4, the lateral sealing surfaces 52, 54 cooperate with circular sealing surface 50, and preferably also cooperate with sealing surfaces 68 described later, in order to form a multi-engagement sealing surface which has different portions of the sealing surfaces engaging the walls defining port 26 at different times to form a seal that prevents or reduces passage of fluid out of port 26.

Additional lateral seals of similar construction could be provided on any surface of the test slide 22. Lateral seals could be provided on the side walls of aperture or port 26, but they would have to extend along a sufficient portion of the port 26 to provide an effective seal suitable for the intended use of the fitting 20 and test slide. The seal on port 26 can comprise raised areas molded into the walls defining port 26, or they can comprise O-rings in recesses in the walls defining port 26, or they can be located in the upper port of the test slide 22 to seal against the walls defining port 26, or combinations thereof.

Referring to FIGS. 1–5, the operation of the test slide 22 is described. The fitting 20 is mated with at least one end 60 of a pipe in the pipe line. The ends 40a, 40b advantageously form female pipe sockets which are appropriately sized to receive the mating pipe ends 60 of the pipe line. Alternatively, the pipe end 60 could have female sockets and the ends 40 comprise male fittings. Further, ends 60 could be other types of fitting, adapters, or pipe ends which abut ends 40 and use other mechanisms to secure them in place. The ends 60 and ends 40 are mated and joined in a sealing manner by any of a variety of known ways, such as cementing, soldering, threading, abutting, using packing rings, etc., as appropriate to the material of the parts being joined. Advantageously the pipe ends 60 and fitting 20 are both made of a polymer, such as ABS (acrylonitrile-butadienestyrene) or PVC (polyvinyl chloride) plastic and can be adhesively bonded. The parts could be made of dissimilar material or of cast iron, and joined by other ways suitable for joining the materials selected, including threads using pipe thread sealing compounds or hub-less devices using clamps.

The boss 36 advantageously extends radially inward of the interior wall 30 of fitting 20 by an amount about the same as, and preferably slightly less than, the thickness of the wall of pipe end 60. The pipe end 60 preferably abuts the side walls of the boss 36 and preferably forms a substantially cylindrical surface defining the flow path through the fitting 20. A joint forming a slightly recessed surface along the longitudinal length of the boss 36 is preferred over a slightly protruding surface, and ideally the surfaces are flush. If cement is used to join the parts, the recess 42 allows any excess cement to collect in the recess 42 and thereby avoid a cement bead forming on a portion of the interior of the fitting 20. Alternatively, the boss 36 may be omitted entirely, and recess 34 and associated walls 38 may be formed directly into the interior surface 30 of the fitting. Moreover, the boss 36 is helpful to use when the fitting has female ends as the boss limits the insertion depths and allows formation of a glue trap at recess 42, but the boss is optional.

After at least one pipe end 60 is joined, if it is desired to pressure test the joined pipe line, then the test slide 22 is inserted into the port 26 so that the slide enters all portions of the recess 34 and the sealing surface 50 forms a seal around the circumference of the main fitting 20 to block flow through the fitting 20. Testing fluid is then introduced into the line to test for leaks under pressure. The distal end of test slide 22 advantageously does not abut the bottom of recess 34, but preferably leaves a gap comprising trap 39 so that any debris in the fitting can be urged by gravity into the trap 39 and thus avoid interfering with proper fitting and sealing of the test slide 22.

When the testing is completed, the test slide 22 is removed from the port 26, releasing the pressure from the test. As the test slide 22 is removed, the distal end of sealing surface 50 exits the recess 34 in the bottom of the boss 36 so that fluid in the line passes the test slide 22. When the top portion of the sealing surface 50 disengages the wall 38 any resistance to fluid passage presented by sealing surface 50 at that location is lost. But the lateral sealing surface 52 is preferably located so that it engages wall 38 to cooperate with a portion of sealing surface 50 and form a seal sufficient to prevent passage of pressurized fluid from fitting 20 through port 26 along the face 46 of the test slide 22. The seal surface 68 engages ends of the port 26 during this period to seal the ends of the port 26.

As the test slide 20 is further withdrawn, the sealing surface 52 disengages wall 38 and again any resistance to fluid passage presented by the sealing surface 52 is lost. Like sealing surface 52, the sealing surface 54 is advantageously positioned so that it engages wall 38 as, and preferably shortly before, sealing surface 52 disengages wall 38 so as to cooperate with a portion of sealing surface 50 and prevent pressurized fluid from passing out the port 26 along the face 46 of the test slide 22. As described here, the walls 38 of recess 34 extend into and form opposing walls of port 26. The visual indicators 69a, 69b allow the person removing the test slide 22 from the fitting 20 to know when the seals 52, 54 engage or disengage so as to allow partial removal of the slide 22 to relieve any pressure in the pipe line from testing. The visual indicators 69a,69b also indicate when a potential fan of fluid might escape the port 26 as the seals disengage the mating surfaces.

In addition to providing resistance to passage of fluid past sealing surfaces 52, 54 when they are engaged with wall 38, the sealing surfaces 52, 54 also provide resistance to movement of the test slide 22. This resistance helps prevent pressure in the fitting 20 from forcing the test slide 22 out of the port 26. Test pressures of about 0–5 psi are common, with pressures of 13 psi (about 30 foot head pressure) being used by some regulatory agencies. Advantageously the combination of the fitting 20 and the test slide 22 is designed to sustain higher internal fluid pressures, and can accommodate pressures of 25 psi minium for at least 15 minutes.

Referring to FIGS. 2, 4 and 5, advantageously the port 26 extends vertically from about the centerline of the fitting 20 so that the largest diameter of sealing surface 50 abuts, or comes very close to, the end walls 62 of the rectangular port 26. The walls 38, 62 thus define the port 26. If the sealing surface 50 abuts the end walls 62 then passage of pressurized fluid can be prevented or reduced. If a slight gap occurs between the radially inner edge of sealing surface 50 and the adjacent end wall 62 of port 26, then pressurized fluid can squirt out through that gap. Thus, it is preferably to keep the gap as small as possible. To reduce this leakage, and preferably prevent it, a sealing surface can be placed around the opening forming the port 26. This can comprise raised surfaces along walls 38, 62, or a groove along these surfaces to hold an O-ring. Similarly, the seal can be formed on the body of the test slide 22 intermediate a flange 64 extending from below handle 44 and above the sealing surface 50, or a groove can be formed thereon for receiving an O-ring.

When these seals are used it is advantageous to use a tapered slide 22 so that the sealing surface 50 does not have to be forced over the seal below the handle 44. When these seals are used, it may be advantageous to round the mating edges of the test slide 22 and the corresponding ends 62 of the port 26, in order to avoid forming a 90 degree corner which is more difficult to seal. Preferably, a pair of raised radial surfaces form side seals 68 positioned on the edges of the test slide 22, at a location corresponding to the horizontal centerline of sealing surface 50 as depicted in the figures. The surfaces are preferably molded on opposite sides of the edges of the outer circumference of slide 22 to seal radially outward against walls 62 forming the recess 34 and port 26, to address this possible source of leakage. The edges extend between opposing faces 48a, 48b of the slide body 46. The sealing surfaces 68 are in a plane through the longitudinal axis of the fitting 20, and as illustrated in the drawings are also in the horizontal plane. Advantageously the side seals 68 extend 10–15 thousandths of an inch beyond the curved sides of the test slide 22. The side sealing surfaces 68 engage ends of the port 26 to reduce, and preferably prevent, leakage through the port 26 past the sealing surfaces 68.

The handle 44 preferably has flange 64 which is configured to be larger than the port 26. The flange 64 is located to limit the maximum insertion of the test slide 22 into the port 26 and to position the sealing surface 50 relative to the walls 38 to achieve a leak proof or leak resistant seal during pressure testing or use of the test slide 22. But there is an advantage if the flange 64 also extends beyond the port 26, because it then forms a barrier to any fluid squirting out the port 26 so the fluid is directed away from the hand of a person gripping handle 44.

Further, extending from opposing ends of flange 64 are locking tabs 65, which are located to be placed adjacent to, and preferably to abut, locking extending from fitting 20. A wire, string, plastic or other flexible member can be wrapped around the locking tabs 65, 67 to fasten the parts together. Other locking mechanisms can be used, such as a resilient latch and a mating engaging surface, each located on opposing parts. An advantage of locking tabs 65, 67 is that an inspector can fasten the parts with colored wire or plastic, and after a predetermined testing time can check to see if the plastic is disturbed, with any disruption in the connection of the locking tabs providing evidence of tampering during the testing.

It is possible to place a seal intermediate the bottom of the flange 64 and the top, exterior surface defining the port 26. This would be a seal located perpendicular to the axis along which the slide 22 travels during its insertion and removal. Such a seal could comprise a groove on one of the flange 64 or top surface defining the port 26, along with a mating O-ring placed in the groove. This sealing configuration is not as desirable as a seal located along the same path traveled by the testing slide as it is inserted into and removed from the fitting 20. Any pressurized fluid will exert a force against flange 64 and that could urge the flange 64 away from the fitting 20 and reduce the effectiveness of any seal on the surface perpendicular to the travel of the test slide 22.

Figure 7:
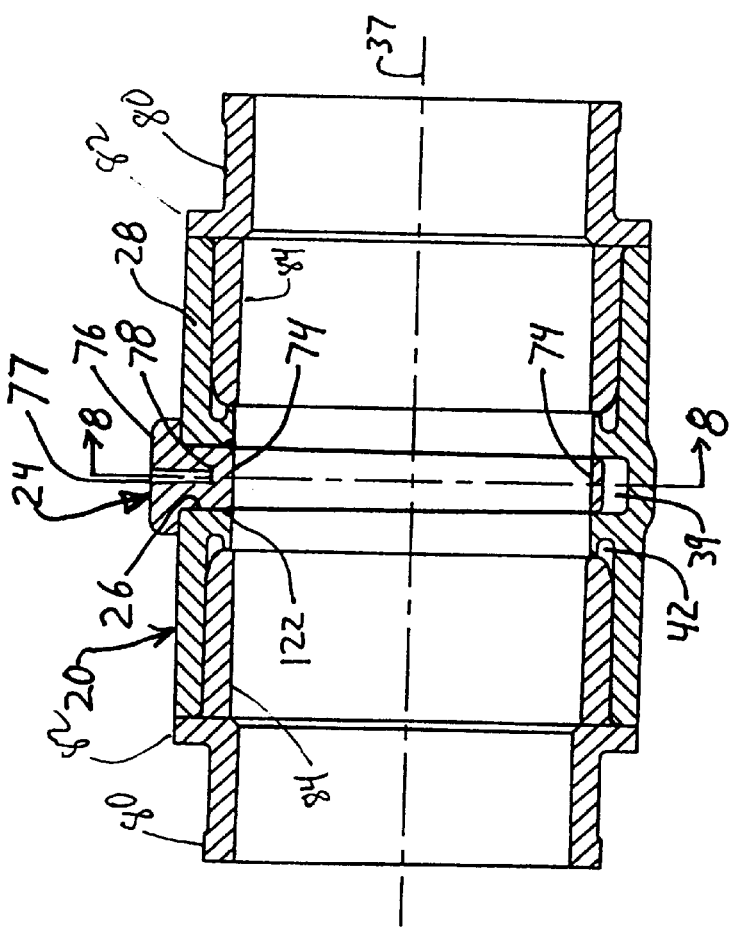
FIG. 7 shows a cross-sectional view of a finish slide with the fitting of FIG. 1 and attached adapters allowing use with flanged pipe, taken along Section 7—7 of FIG. 8.
Figure 10:
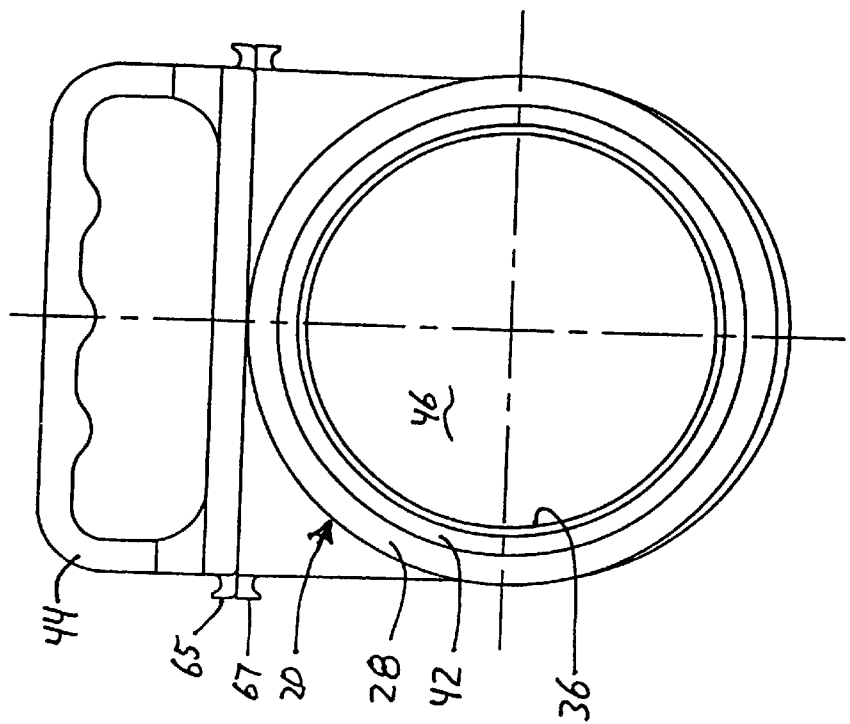
FIG. 10 shows a plan, end view of the fitting and test slide of FIG. 9.
Figure 9:
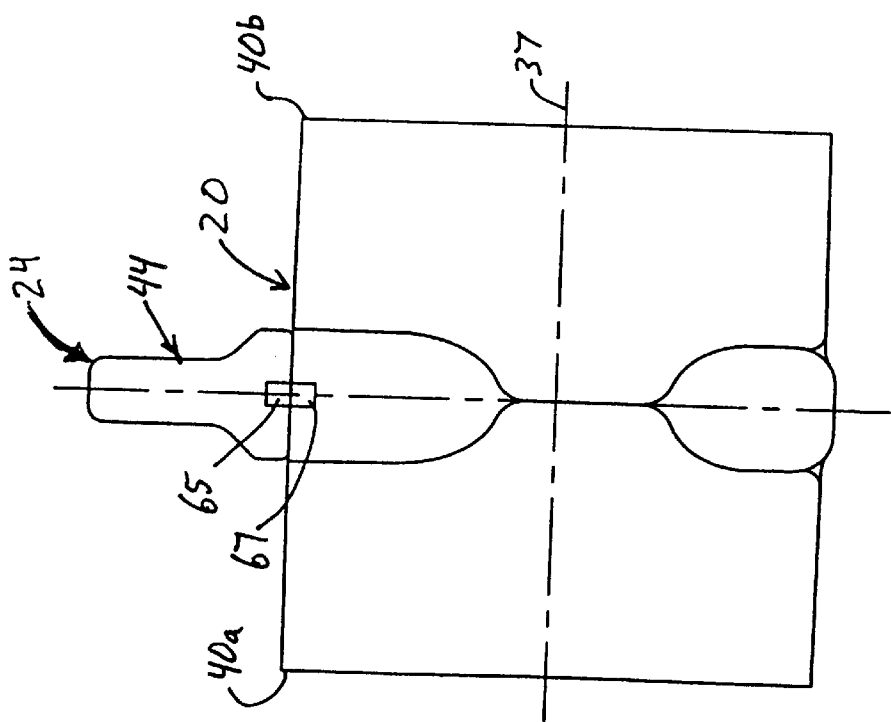
FIG. 9 shows a plan, side view of the fitting and test slide of FIG. 1.

Referring to FIGS. 6–8, the finish slide 24 will be described. The finish slide 24 is configured to fit within the recess 34 and allow fluid flow through both the finish slide 24 and the main fitting 20, while sealing the port 26. The finished slide thus has a slide body 70 (FIG. 8) having an opening 72 therein. The opening 72 advantageously corresponds in shape and size to the interior diameter of the boss 36 so that when the slide 24 is inserted into the recess 34, preferably, but optionally, a substantially cylindrical surface is formed having the same internal diameter as the boss 36. If the boss 36 has been omitted as previously discussed, this same cylindrical relationship is then formed between the opening 72 and the inside surface 30 of the fitting.

When the pipe ends 60 are inserted into the fitting 20 they advantageously have a uniform wall thickness which corresponds to the amount that the boss 36 extends into the interior of main fitting 20 so there is preferably, but optionally, a substantially uniform diameter flow passage formed through fitting 20. As used in the description, "substantially" refers to dimensions varying about 15% or less of the thickness of the walls of pipes 60 or the walls 28, and preferably refers to dimensions varying less than 10% of the wall thickness. This readily accommodates changes as might arise in misalignments and dimensional changes of manufacturing. Ideally, there are no protrusions or misalignments that would prevent the main fitting from meeting plumbing code requirements for drain, vent and waste lines, or for other applicable regulatory requirements such as for water lines. Those regulatory codes typically preclude protrusions or recesses that might collect debris in pipes and thereby lead to undesirable contamination or restriction of the fluid flow through the pipe line.

The opening 72 is defined by walls 74 that are generally parallel to the longitudinal axis 37 and the interior surface 30

(FIG. 1) of wall 28. The thickness of the finish slide 24 along the longitudinal axis 37 is slightly less than the width of the corresponding portions of the recess 34 into which the slide 24 fits when installed. A close fit is desired, with some slight gap between adjacent parts being acceptable—depending on the type of fluid passing through the pipe line. Preferably, the fit is close enough so as to allow insertion of the finish slide into the recess with a thin layer of cement interposed between abutting surfaces so that the surfaces are bonded together to form a seal around the circumference of the fluid flowing through the slide 24 and through the fluid passage in the fitting 20.

The finish slide 24 has a flanged exterior end 76 which is larger than the port 26. The flanged end 76 is located relative to the opening 72 so as to limit the maximum insertion of the finish slide 24 into the port 26 and to position the walls 74 defining opening 72 in the slide 24 so that the opening 72 aligns with the interior of the passage through fitting 20. A rectangular sink 77 is formed in the flanged end 76. The sink 77 has a long axis aligned with the long axis of the rectangular cross section of the slide 26, and is centrally located. The interior end of the sink 77 is preferably, but optionally, semicircular shaped and concentric with the opening 72. The sink 77 forms a recess that avoids material shrinkage and sinking of the surface as the molded slide 26 cools, and it also serves as a material saver.

The flanged end 76 has a body portion 78 which extends into the top end of port 26 and which is preferably configured with dimensions slightly larger than those of the engaging portions of port 26 so as to form an interference fit and a tight seal when inserted into port 26. An interference fit of about 10–15 thousands of an inch is believed suitable. The slight interference fit is small enough so that if the body portion is formed of a thermoplastic polymer (e.g., ABS, PVC, etc.) then the cement placed on one or both of the parts melts the polymer and the slight interference fit causes a wiping action with the abutting walls forming port 26 to ensure fluid-tight bonding of the body portion 78 to the abutting walls forming port 26.

The distal end of finish slide 24 preferably ends before abutting the wall 28, so as to leave trap 39 available to collect debris and avoid any blockage that might prevent slide 28 from aligning the opening 72 with the interior of the passage through the fitting 20 as needed. The finish slide 24 is preferably bilaterally symmetric so that it can be inserted into the port 26 and form a sealing engagement in either of two orientations.

The use of the finish slide 24 will now be described. After pressure testing is completed, the test slide 22 is removed and replaced with the finish slide 24. Advantageously, an adhesive is interposed between the surfaces of the finish slide 24 and the portions of the recess 34 and port 26 which will abut, so as to form a permanent connection, and to ensure a fluid tight connection. This can be achieved by placing an adhesive on the abutting surfaces of one or both of the slide 24 and the inside periphery of port 26, and then inserting the slide 24 into the port 26. Advantageously the adhesive is placed on the generally vertical walls of the upper portion 78 of slide 24 that abut walls 38, 62 of the port 26 so that an adhesive joint is formed vertically. Advantageously the adhesive is also placed on the generally horizontal surfaces of the underside of flange end 76 so that an adhesive joint is also formed horizontally. Thus, the finished flange is adhered to the fitting 20 along two generally perpendicular axes. Advantageously, the finish slide 24 has the same color as the fitting 20 so that a visual inspection can determine the finish slide is being used.

Acceptable results may be obtained by applying the adhesive to fewer surfaces. Alternatively, but less preferably, the adhesive can be omitted and other sealing and fastening mechanisms used to ensure the assembly of the fitting 20 and the finish slide 24 does not leak and the finish slide is not inadvertently removed. Such mechanisms could include an interference fit, O-rings, threaded fasteners such as screws joining the parts, latches extending between the fitting 20 and slide 24, flexible or rigid connections with opposing ends fastened to the slide 24 and fitting 20, and a variety of other mechanisms.

If the fitting 20 is made of a thermoplastic polymer (e.g., PVC, ABS, etc.), then the test slide 22 is preferably in place when the fitting 20 is bonded to any of the adjacent pipe line 60 in order to avoid any overflow of bonding adhesive from entering the recess 34 and inhibiting later entrance of the slides 22, 24 into and out of that recess. Preferably, the main fitting 20 is made of PVC or ABS, with the finish slide 24 being made of the same material as the fitting 20 to make the adhesive bonding to the fitting 20 easier. On the other hand, the test slide 22 is preferably made of a material different from the fitting 20, and preferably is made of a polymer such as EPDM or a fluoroelastomer that will not adhere to the fitting 20 with common pipe cements. This helps avoid accidentally gluing the test slide 22 in place instead of the finished slide 24. Other potentially suitable materials for test slide 22 include propylene rubber, Teflon, silicon rubber, or TPE (thermoplastic elastomer). The slides 22, 24 can be cast, machined, injection molded, compression molded or blow molded, depending on the materials used. Injection molded elastomers are believed preferable.

While the test slide 22 is preferably molded integrally of a single material with the various sealing surfaces 50, 52, 54 etc., it can also be molded around an insert of metal or other material to provide additional strength and rigidity. This molding over a strengthening frame or insert can be particularly useful as it allows the exterior mating surfaces of the test slide 22 to be made of a resilient material that may readily form a good seal with the abutting surfaces of the port 26 and recess 34. An EPDM material compression molded onto a steel insert is believed suitable, as is a TPE material overmolded onto a molded nylon insert. Further, the fitting 20, test slide 22 and finish slide 24 could be made of metal, and if so the fitting is preferably made of cast iron.

The main fitting 20 is preferably injection molded of a polymer and used with pipes of the same or similar material. The fitting 20 could be made by other means. Referring to FIGS. 7–8, the main fitting 20 can also be used with pipes of different material, such as cast iron pipes 80, and the fitting 20 could be made of metal suitable for use in the particular pipe line involved. If dissimilar materials are used the pipes can be joined and sealed in various ways. For example, couplings can be inserted inside or enclosed around the abutting end of the pipes and/or fittings so the coupling extends across the abutting ends, held in place by hose-clamps.

In some cases, the pipes 80 may have flanged ends 82. A tubular insert 84 can be inserted into the end of the main fitting 20 to be joined to the cast iron pipe 80. The insert 84 is preferably, but optionally glued in place into fitting 20. The inner diameter of the tubular insert 84 is selected to be about the same as, or slightly larger than the inner diameter of pipe 80. The inner diameter of boss 36 and inner walls 74 defining opening 72 are about the same as, or slightly larger than the inner diameter of tubular insert 84. That construction provides a slightly larger diameter flow passage through the main fitting 20, which helps avoid the collection of debris. Advantageously there are no reduced diameters or protrusions into the flow path of fluid flowing through the main fitting 20 as would encourage the accumulation of debris.

The tubular insert 84 provides a larger abutting surface area for joining to the flanged end of pipe 80. They may be joined and sealed against leakage by methods common to the plumbing practice, such as tubular rubber or polymer couplings and band clamps.

Figure 12:
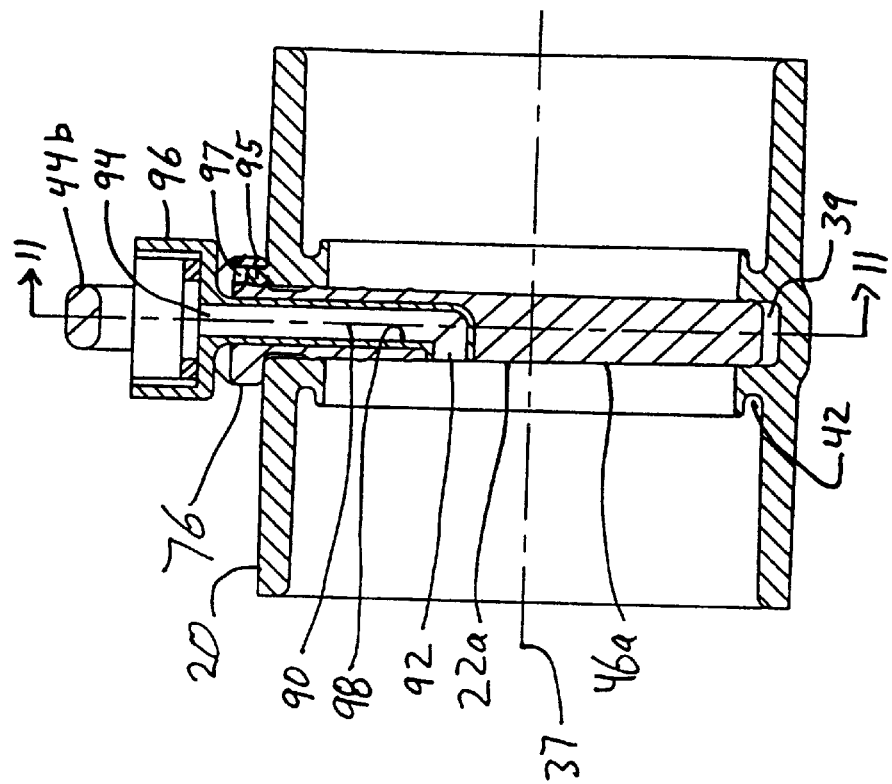
FIG. 12 shows the embodiment of FIG. 11 in a sectional view taken along Section 12—12 of FIG. 11.
Figure 11:
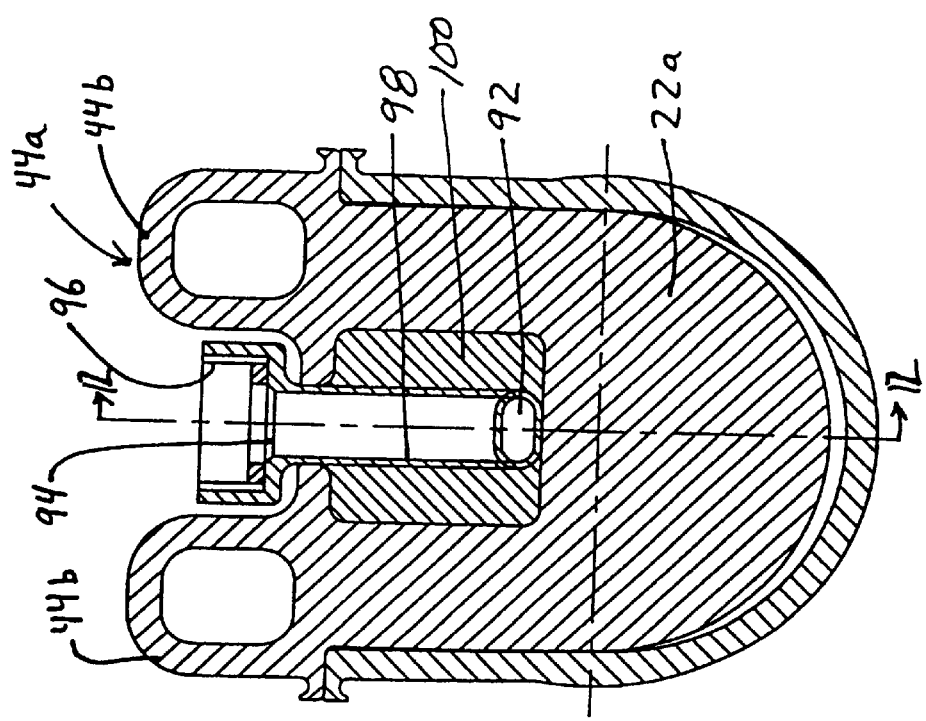
FIG. 11 shows an alternative embodiment of the test slide of FIG. 1 in a cross-sectional view taken along Section 11—11 of FIG. 12.

FIGS. 11–12 show a further embodiment of this invention in which a fill drain is provided in which a fluid passage 90 extends from outside the fitting 20 to be placed in fluid communication with the fluid passage through fitting 20. The fluid passage 90 can be achieved many ways, including using a hollow test slide 22 with a cap over an opening that is accessible external to the fitting 20. But preferably, a modification of test slide 22 is used, and only the changes will be discussed. The modified testing slide 22a contains a pressurizing fitting or pressurizing connection for coupling a source of pressurizing fluid to the fluid passage inside the fitting 20. When the pressurizing connection is formed in the slide 22a, the connection advantageously comprises a fluid passage 90 which has a first, outlet end 92 opening on an upstream face 46a of the testing slide 22, within the fitting 20 so as to allow the passage of fluid into the fitting 20. A second, inlet end 94 of the fluid passage 90 is advantageously adapted to connect to a pressurized water supply, such as a garden hose connected to a municipal water supply. The connection is advantageously achieved by a threaded fitting 96 connected to inlet end 94 and configured to receive the end of a garden hose. Either a male or female fitting may be selected, depending on the ease of manufacture and whether or not it is deemed acceptable to require the plumber to carry special-purpose hoses or adapters. The inlet end 94 is located above the flanged end 76 and the handle 44a is modified to accommodate the female fitting 96. Preferably, the handle 44a has two gripping areas 44b on opposing sides of fitting 96. Other types of connections can be used and will vary depending on the source of the pressurized fluid. Further, other shapes of handles 44a,b may be supplied for gripping the slide 22a.

When the test slide 22a is installed in the main fitting 20, a source of water, such as a garden hose (not shown) can be fastened to the fitting 96 and water turned on to fill and pressurize the pipe line for testing.

The outlet 92 must be on the upstream side of the pipe line. To ensure the correct orientation, it may be desirable to key the test slide 22a to the orientation of fitting 20 so the test slide 22a can be only installed in the correct orientation relative to fitting 20. Various ways are known and can be used to achieve this orientation keying. For example, a pin or protrusion 95 (FIG. 12) could be placed on the main fitting 20 with mating recess 97 (FIG. 12) on the flange 76 such that alignment of the protrusion 95 and recess 97 are required to allow insertion of the test slide 22a. Alternatively, mating shapes on the port 26 and test slide 22a could be used that are not symmetric so as to ensure correct orientation. Other orientation alignment mechanisms could be used to ensure the orientation of the test slide 22a corresponds to a desired orientation of the testing fitting 20.

The fluid passage 90 can be readily made in a molded test slide 22a. For example, the fitting 96 may be coupled to a tube 98 having a diameter sized to fit inside test slide 22a. The tube 98 may have a first portion extending vertically along the length of the test slide 22a, bending at its distal end 92 so it is orientated to open onto the upstream side of the slide 22a. A flange or anti-rotation blade 100 may extend from opposing sides of the tube, preferably connecting to the middle of the tube along the vertical portion. The blades 100 can be glued to the tube 98, or integrally molded with the tube 98. This assembly of tube 98, blades 100 and inlet fitting 96 can then be molded into the testing slide 22a.

Referring to FIGS. 13–14, a further embodiment is shown in which fluid passage 90 comprises a fill and drain port 110 formed in fitting 20, preferably located to either side of recess 34 and preferably radially outward of the longitudinal axis of fitting 20. The port 110 provides an opening extending from outside the fitting 20 to the inside of the fitting. A coupling 112 may be connected to the external portion of the port 110 to allow a fluid line to be coupled to the port. A coupling 112 configured to receive a garden hose is preferred, as discussed above, but other sizes and shapes could be used.

The port 110 allows a water or air supply to be connected to the fitting 20 so that pressurized water or air can be introduced into the upstream side of the pipe line being tested. When finished, the pressure is released by at least partially removing the slide 22, or optionally by allowing drainage through the port 110. A cap or plug is then applied to the port 110 to reseal the pipe line. For pressure testing the pipe line, the pressuring fluid need not be connected to the fitting 20, but could be connected to other portions of the pipe line through various means known to those skilled in the art. Preferably though, the pressurizing fluid is provided through the fitting 20.

In order to avoid interference with any pipe which may be inserted into the ends 40 of fitting 20, and depending on the type of pipe application intended, this configuration may require that the fitting 20 be made asymmetrical, extending features of the fitting 20 to a greater degree on the side where drain port 110 is located so that any joining ends of the pipe line do not abut the coupling or port 110. The port is advantageously formed through the boss 36 if the boss is present. The port 110 is preferably located in the same angular orientation as port 26, with respect to the longitudinal axis of the fitting 20, so that a plane through the longitudinal axis 37 passes through a central axis of both the port 26 and the port 110. But other locations could be used, and the port 110 in FIGS. 13–14 extends at a right angle relative to the port 26. If the port 110 is formed on the vertically bottom side of the fitting 20 when installed, the port 110 could be used to drain the line after testing. As mentioned, when testing is completed, a cap or plug (not shown) is installed onto at least one of the coupling 112 and port 110 to seal the port. A permanent adhesive is preferably used to permanently seal the port and prevent removal of the cap or plug and un-sealing of the port, but this is optional.

Figure 15:
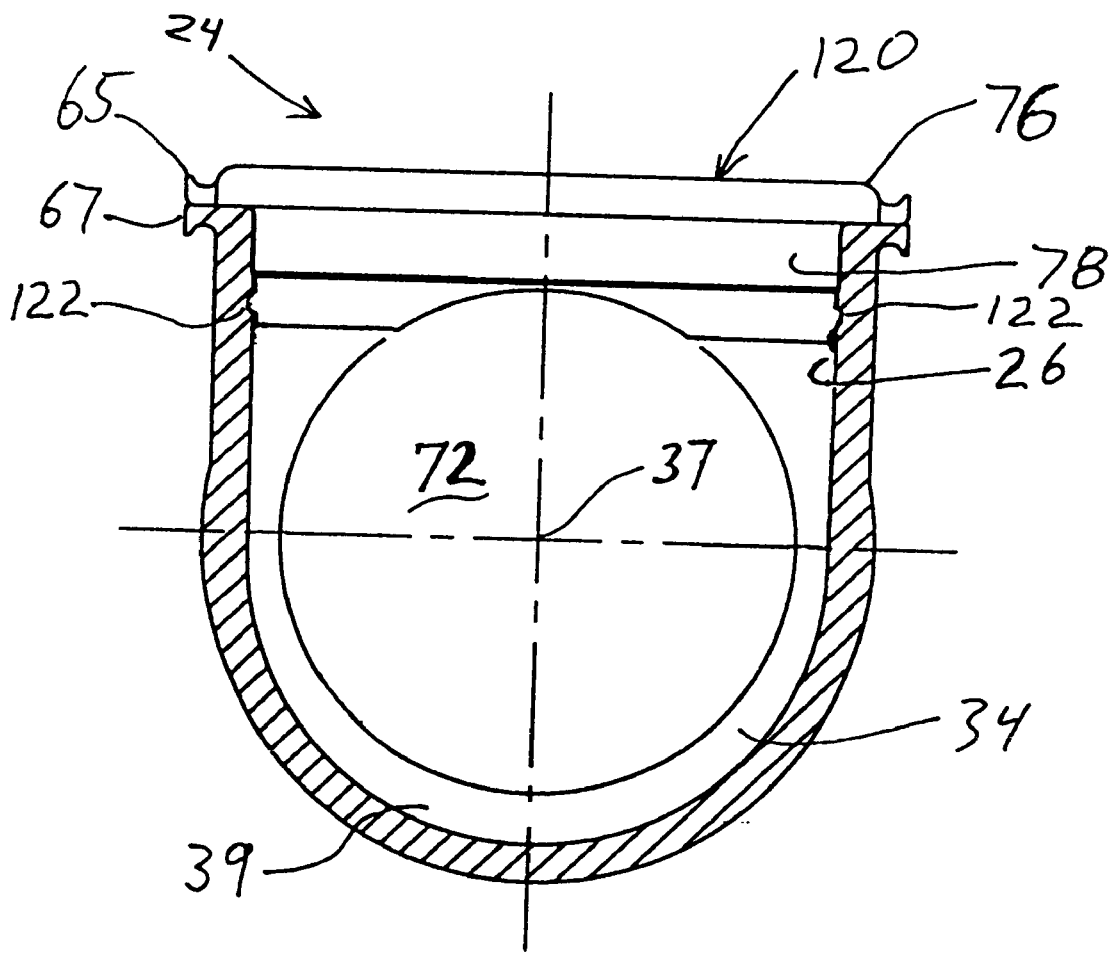
FIG. 15 shows an alternative embodiment of a sealing slide which does not completely block a recess in the fitting.

Referring to FIG. 15, a further embodiment is shown in which the finish slide lacks any distal portion completely defining a circular opening 72, or entirely omitting opening 72. There is thus shown a cap 120 having a flanged end 76 as previously described on finish slide 22. The cap 120 also has body portion 78 as previously described. Advantageously the cap 120 terminates after the body portion 78. This leaves the remainder of the port 26 and recess 34 open and results in a fluid passage that is not smooth and not continuous. Thus, preferably, but optionally, at least some portions of the distal body defining opening 72 could be included to form a continuous flow surface over the location of the recess 34. The main purpose of the cap 120 is to seal the port 26 while not necessarily filling or covering all of the recess 34, and the body portion 78 can achieve that seal when it is glued to the walls defining port 26.

A secondary and optional use of the cap 120 is to fill a portion of the port 26 and/or recess 34 intermediate the longitudinal axis 37 and the body portion 78 to provide a smoother flow path to that portion of the fluid passage by providing a substantially continuous surface with not substantial recesses, cavities or protrusions, and especially lacking such discontinuities as would be prohibited under plumbing codes for such pipe lines.

Preferably, but optionally, a slightly raised sealing surface 122 extends around the distal end of body portion 78 and is located to engage the walls defining port 26. A seal height of 10–15 thousandths of an inch is believed sufficient for the sealing surfaces 122. The sealing surface 122 allows a temporary seal in the event it is needed before permanently fastening the cap 120 to fitting 20 to seal port 26. The distal end of cap 120 advantageously terminates with body portion 78, but the distal end can also be constructed to extend into a portion of the recess 34 and form a smooth surface across the recess as in finish slide 24. Preferably the distal end of the cap 120 does not extend beyond the middle of the flow passage through the fitting 20. That leaves a portion of recess 34 open, and leaves the trap 39 open if the recess is formed to contain a trap 39.

Advantageously locking tabs 65 extend from the cap 120 to align with locking tabs 67 on the fitting 20. A fastener can connect the tabs 65, 67 to indicate the cap 120 and/or entire finish slide 24 is locked into position.

Referring to FIGS. 18–27, a further embodiment of this invention is shown in which the previously described fitting 20 comprises a modified fitting 220 (FIGS. 18–22) that is optionally, but typically, made of metal, such as cast iron. An insert 221 is placed into the fitting 220, with the insert 221 being configured to hold the test slide 22 and finish slide 24.

The fitting 220 has a fluid passage extending therethrough along centerline 37 with the fluid passage defined by walls 28 of the fitting 220. An exteriorly accessible opening or port 226 opens into a recess 234 that is generally orthogonal to the longitudinal axis 37 and the fluid flow path. The recess 234 extends around the periphery of the fluid flow path through the fitting 220. As shown, it comprises a generally rectangular opening at the port 226. Flanges 282 are formed at opposing ends of the fitting 220, the flanges preferably extending away from centerline 37.

Referring to FIGS. 23–27, the insert 221 has an exterior surface configured to correspond with the recess 234. Seals 250 are provided on opposing faces of insert 234 to engage walls forming the recess 234 in a sealing engagement around an opening 272 corresponding to the location of the flow path through the fitting 220 when the insert 221 is seated in the recess 234. As illustrated, the opening 272 comprises a circular opening extending through the insert 221.

The insert 221 has an internal cavity formed by a port 26 that opens into recess 34 defined by walls 38 as previously described. A trap 39 preferably is provided, as previously described.

The insert 221 is preferably made of plastic and is configured so that it can be inserted into the recess 234 of the cast iron fitting 220 in order to allow the previously described slides 22, 24, and variations thereof, to be used with cast iron pipe lines 60. The end flanges 282 can be joined to correspondingly shaped end flanges on cast iron pipe lines 60 by radial compression clamps, such as hose clamps, with a sealing sheath or cylindrical sealing material interposed between the clamp on the one side, and the fittings and pipes on the other side.

The insert 221 is preferably of a softer material than the fitting 220 so that the insert 221 can be press fit into the recess 234 to not only hold the insert in place, but to form a fluid tight seal. As mentioned, the insert is preferably of plastic, and as such could be press-fit into a cast-iron fitting 220, or over-molded to the fitting 220. A plastic insert 221 could be glued in place, ultrasonically bonded in place, or a gasket inserted around port 226 as needed to prevent leakage.

The insert 221 could be of metal, such as cast iron, or other material compatible with the fitting 220. If made of metal, the insert 221 is preferably of a softer material than the fitting 220, such as brass, aluminum, copper, so that the fitting can be press fit into the recess 234. Advantageously, the insert 221 forms a fluid tight seal with the recess 234 so no fluid leaks out of the juncture between the insert 221 and fitting 220. Adhesives or sealants can be used as appropriate. The insert 221 preferably has flanges or locking tabs 67 as previously described in order to allow the insert 221 to be positively fastened to test slide 22 or finish slide 24 as previously described.

While the insert 221 is preferably press-fit into the recess 234, a positive fastening device could be used. Thus, flanges could be provided on one or both of the insert 221 and fitting 220, with bolts, wire, spring locks, or other fastening mechanisms being used to positively fasten the parts together. Further, the insert preferably has tabs 65 adjacent port 26 for use in fastening to slides 22, 24 as previously described.

There is thus advantageously provided a non-removable insert 221 configured to be placed in a recess 234 in a fitting 220 to define a flow path through the fitting and insert. The insert 221 in turn has an exteriorly accessible access port 26 through which test and finish slides 22, 24 can be inserted to block the flow path through the fitting 220. Once installed, the insert 221 effectively becomes part of the fitting 220. The finish slide 24 can be fastened to the insert 221 as previously described, and the test slide 22 can be used with the insert 221 as previously described. For ease of illustration the portions of the insert 221 that mate with the test slide 22, finish slide 24, and pipe line 60 are not described in detail, but it is understood that the various features previously described could be used with the insert 221.

Referring to FIGS. 28–35, a further embodiment of a test slide 22 of this invention is shown. The previously described fitting 20 can be used but the test slide 22 is modified to be part of a unit with additional seals and can be locked into a closed position by rotating a handle 300 to engage a locking pin 302 with an engaging portion 304 on a cap 306 that is fastened to the fitting 20 by spring locks 308.

The cap 306 is shaped to overlap port 26 (FIG. 32), and has a sealing gasket 310 located to engage the port 26. As depicted, the port 26 comprises a rectangular opening so the cap 306 has a rectangular shape with a rectangular gasket 310. The cap 306 preferably, but optionally, has a flange 312 (FIGS. 31–33) that overlaps and engages the periphery of the port 26 to form a more fluid tight seal between the cap and the fitting 20 around the port 26. The gasket 310 has an opening through which the test slide 22 can be inserted or withdrawn.

The test slide 22 can take the form of any of the test slides described herein. The test slide 22 is shown slightly modified by having a convex-shaped cross section that is thicker at the middle than at the periphery where the slide engages the recess 34 in the fitting 20, as best seen in FIGS. 31–33. Further, the sealing faces 48 are shown as being custom formed by being molded to extend intermittently through the body of the test slide. The test slide 22 is also shown as tapered, being wider adjacent the port 26 and narrower adjacent the trap 39.

The test slide 22 is connected to a shaft 314 that extends through the cap 306 and connects to the handle 300. The walls of the cap 306 form a cavity 316 (FIGS. 31–33) located above the port 26. The cavity 316 is sized to allow the test slide 22 move between a fully inserted position (FIG. 31) to a partially inserted position (FIG. 33). The partially inserted position allows the test slide 22 to partially block, and partially open, the fluid passage through the fitting 20. The test slide 22 is preferably molded or assembled around one end of the shaft 314, so there is thus formed a portion of larger dimension than the shaft extending for a portion of the length of the shaft and ending in a limit stop 318 (FIGS. 31–33).

The shaft 314 passes through an opening in the cap 306, but the limit stop is too large to pass, and thus when the limit stop hits the top of the cap 306, the movement of the test slide 22 relative to the cap is halted. As the cap 306 is fastened to the fitting 20 by spring locks 308, the limit stop 318 limits the distance that the test slide 22 can be removed from blocking the fluid passage through the fitting 20. The limit stop 318 limits relative motion of the shaft 314, and of the test slide 22 relative to the cap 306. The limit stop 318 could be formed on the shaft—as by having a pin extend to engage the cap. The limit stop 318 could be formed on the cap, as by having a boss or projection engage the test slide or some portion of the shaft. Given the present disclosure, other arrangements to limit the relative motion of the cap 306 and test slide 22 would be devisable by one skilled in the art.

A seal, such as an O-ring seal 320 around the shaft 314 where the shaft passes through the cap 306, allows movement of the shaft relative to the cap but prevents passage of fluid from the cavity 316. Advantageously the seal 320 is located in a recess in the cap 306 to help restrain movement of the seal 320. A retaining device, such as a gasket or washer 322 helps hold the seal 320 in place within the cavity 316.

As the test slide 22 is partially removed after pressure testing the system, pressure in the fitting 20 may force the test slide away from the fitting, and may force fluid around the sealing surfaces 48 and any lateral seals 50 (FIG. 2) which have disengaged from the mating recess 34. This pressurized fluid is partially restrained by gasket 310, but can enter the cavity 316 in cap 306. But the seal 320 prevents the pressurized fluid from leaving the cap 306 around the shaft 314, and the flange 312 and/or the gasket 310, along with cap 306, prevent fluid from exiting the cap 306 where it engages the fitting 20 around the port 26. The limit stop 318 restricts movement of the test slide 22 out of the fitting 20. There is thus advantageously provided a means for limiting movement of the test slide while releasing pressure from testing, and a means for reducing, if not eliminating, fluid leakage as the test slide is partially removed to relieve the pressure in the line from testing. By varying the location of the limit stop 318, the amount of movement of the test slide 22 can be changed. The limit stop 318 could be threaded around the shaft 314 in order to allow field adjustment of the test slide position.

Referring to FIGS. 28–31 and 34, the cap 306 has a locking housing 322 in which the engaging portion 304 is formed. The lock pin 302 is connected to shaft 314 outside of the cap 306. The pin 302 advantageously extends orthogonal to the longitudinal axis of shaft 314. As the pin 302 moves with the shaft 314, it can be rotated into alignment with a slot 322 that contains engaging surface 304 that is orientated to restrict movement along the longitudinal axis of shaft 314 when the pin engages the engaging surface 304. The pin 302 and engaging surface 304 are located so they restrain movement of the shaft 304 when the test slide 22 is fully engaged with the recess 34 to block all fluid passage through the fitting 20, as generally shown in FIG. 31. The handle 300 is thus pushed down, and rotated to engage the locking pin with engaging surface 304, to lock the test slide in the closed position. There is thus provided a locking mechanism for positively locking the test slide in the closed position.

Referring to FIG. 31, the shaft 314 is connected to the test slide 22 in a manner which allows the described rotation. A vertical slot in the end of a portion of the test slide 22 can allow an enlarged portion 324 on the mating end of the shaft 314 to engage a restricted cavity in the test slide and cause the test slide to move with the shaft to engage and disengage the test slide 22 with the recess 34. Alternatively, the test slide 22 could be molded to the shaft 314 and a way could be provided to allow rotation of the handle 300 relative to the shaft 314. One such way is to mold the handle 300 with clearance relative to the shaft 314.

The spring locks 308 removably fasten the cap 306 to the fitting 20. Other removable connections can be used to removably fasten the cap 306 to the fitting 20, including threaded fasteners, clamps, hose fittings, wire ties, etc. After removal of the cap and test slide 22, a finish slide 24 can be installed as previously described.

The above description is given in relation to a pipe line of the type used in the water supply or drainage system of homes, apartments and other buildings. But the apparatus and method are applicable to any tube through which a fluid passes, where fluid includes gases, liquids, or combinations thereof, or solids entrained in gases or liquids, or combinations thereof, and the reference to pipe lines is to be read broadly to encompass such tubes and various applications unless stated or described otherwise.

The above description is given by way of example, and not limitation. Given the above disclosure, one skilled in the art could devise variations that are within the scope and spirit of the invention, including various ways of configuring the slides and sealing the slides to the fitting. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

We claim:

1. A pressure testing kit for testing the pressure in a pipe line, comprising:

a main fitting having at least one end adapted to connect to an end of a pipe and align a fluid passage of the pipe with a fluid passage extending through the main fitting, the main fitting having formed therein a port defined by walls and opening on an exterior side of the fitting and aligned with a recess extending around an internal circumference of the fluid passage in the main fitting;

a first test slide sized and configured to be removably inserted through the port and into the recess to block the flow of fluid through the main fitting;

a second finish slide sized and configured to be inserted into the port and recess and cooperating with each of the walls to seal the port.

2. The pressure testing kit of claim 1, wherein the finish slide has an opening corresponding in size and shape to the fluid passage through the main fitting to allow flow through the finish slide while providing a smooth flow surface across the finish slide and immediately adjacent portions of the main fitting.

3. The pressure testing kit of claim 1, wherein the test slide further comprises a fluid passage having a first end opening onto an exterior surface of the slide when the slide is inserted into the port and a second end opening into the fluid passage of the main fitting when the slide is inserted into the port.

4. The pressure testing kit of claim 3 wherein the first end of the fluid passage is configured and sized to connect to an end of a garden hose.

5. The pressure testing kit of claim 1 wherein the at least one end of the main fitting adapted to be connected to the pipe has a pressurizing connection sized and configured to connect to a fluid source, the pressurizing connection being in fluid communication with the fluid passage of the main fitting.

6. The pressure testing kit of claim 1, wherein the main fitting has a boss extending toward a longitudinal centerline of the fitting, with the recess being formed in the boss.

7. The pressure testing kit of claim 6, wherein the boss has at least one side wall extending perpendicular to the longitudinal axis, the at least one side wall having a recess therein extending around a circumference of the flow path to receive adhesive.

8. The pressure testing kit of claim 1, wherein the recess has a portion sized larger than the test slide and configured to form a space between the test slide and a radially outward wall defining the recess when the test slide is inserted into the recess.

9. The pressure testing kit of claim 1, wherein the test slide further comprises at least one lateral seal having a straight portion extending perpendicular to the direction of travel of the test slide as it is removed from the port in order to seal against fluid passage out of the port across the face of the lateral seal when the lateral seal engages walls defining the port.

10. The pressure testing kit of claim 1, wherein the test slide further has an edge around its periphery, with a seal located on the edge to engage a radially outward wall forming a portion of the recess and port.

11. The pressure testing kit of claim 1, wherein the port in the fitting comprises a port in an insert that is placed in a first opening in the fitting and fastened to the fitting, with a fluid-tight seal being formed between the insert and the first opening to prevent leakage of fluid from the fluid passage to the exterior of the fitting, the fitting having a second recess extending around an internal circumference of the fluid passage in the main fitting configured to receive the insert, the fluid passage extending through the insert, and the first recess into which the finish slide and test slide are inserted being formed in the insert.

12. The pressure testing kit of claim 1, further comprising a removable, exteriorly-accessible cap having a fluid tight seal interposed between the cap and fitting, the cap defining a cavity into which a portion of the test slide can be removably placed, the test slide being connected to a shaft extending through the cap, the shaft being connected to a handle to move the test slide into and out of the cap, the shaft having a sealing surface configured to prevent fluid leakage from the cap along the shaft.

13. The pressure testing kit of claim 12, wherein the insert has a stop on one of the test slide or shaft configured to limit motion of the test slide to define a partially blocked flow passage through the main fitting.

14. An assembly for testing the pressure in a pipe line, comprising:

a fitting having at least one end adapted to connect to an end of a pipe and align a fluid passage of the pipe with a fluid passage extending through the main fitting, the fitting having formed therein a port defined by walls and opening on an exterior side of the fitting and aligned with a recess extending around a circumference of the fluid passage in the fitting, and a first test slide sized and configured to be removably inserted through the port and into the recess to block the flow of fluid through the main fitting, wherein the test slide further comprises at least one lateral seal having a straight portion extending perpendicular to the direction of travel of the test slide as it is removed from the port in order to seal against fluid passage out of the port across the face of the lateral seal when the lateral seal engages at least one of the walls defining the port.

15. The pipe fitting assembly as defined in claim 14, wherein the test slide further comprises a fluid passage having a first end opening onto an exterior surface of the slide when the slide is inserted into the port and a second end opening into the fluid passage of the fitting when the slide is inserted into the port.

16. The pipe fitting assembly of claim 15, wherein the fitting has a boss extending toward a longitudinal centerline of the fitting, with the recess being formed in the boss.

17. The pipe fitting assembly of claim 14, wherein the boss has at least one side wall extending perpendicular to the longitudinal axis, the at least one side wall having a recess therein extending around a circumference of the flow path to receive adhesive.

18. The pipe fitting assembly of claim 14, wherein the recess has a portion sized larger than the test slide and configured to form a space between the test slide and a radially outward wall defining the recess when the test slide is inserted into the recess.

19. The pipe fitting assembly of claim 14, wherein the test slide further has an edge around its periphery, with a seal located on the edge to engage a radially outward wall forming a portion of the recess and port.

20. The pipe fitting assembly of claim 14, further comprising a second finish slide sized and configured to be inserted into the port and recess to seal the port when the test fitting is removed from the fitting.

21. The pipe fitting assembly of claim 14, wherein the at least one end of the fitting adapted to be connected to the pipe has a pressurizing connection sized and configured to connect to a fluid source, the pressurizing connection being in fluid communication with the fluid passage of the main fitting.

22. The pipe fitting assembly of claim 14 further comprising an insert placed through an opening in the fitting with a fluid tight seal between the insert and the opening in the fitting, the port being formed in the fitting insert, and the recess to receive the test slide being; formed in the fitting insert.

23. The pipe fitting assembly of claim 14, further comprising a removable, exteriorly-accessible cap on the fitting, the cap defining a cavity into which a portion of the test slide is removably placed, the test slide being connected to a shaft extending though the cap, the shaft being connected to a handle to move the test slide into and out of the cap to removably engage the recess and seal the fluid passage through the fitting, the cap and shaft having sealing surfaces configured to prevent fluid leakage from the cap when the cap is placed on the fitting.

24. A method for use in pressure testing a pipe line, comprising:

inserting the first test slide of claim 1 into a port of a test fitting to block the fluid flow through the test fitting; and pressure testing the pipe line; and removing the test slide from the port and inserting the second finish slide of claim 1 into the port and sealing the port by cooperation of walls defining the port and the finish slide to prevent fluid passage out of the port.

25. A pressure testing kit for testing the pressure in a pipe line, comprising:

a main fitting having at least one end adapted to connect to an end of a pipe and align a fluid passage of the pipe with a fluid passage extending through the main fitting, the main fitting having formed therein a port opening on an exterior side of the fitting and aligned with a recess extending around an internal circumference of the fluid passage in the main fitting;

a first test slide sized and configured to be removably inserted through the port and into the recess to block the flow of fluid through the main fitting;

a second finish slide sized and configured to be inserted into the port and recess to seal the port, the finish slide having an opening corresponding in size and shape to the fluid passage through the main fitting to allow flow through the finish slide while providing a smooth flow surface across the finish slide and immediately adjacent portions of the main fitting.

26. A pressure testing kit for testing the pressure in a pipe line, comprising:

a main fitting having at least one end adapted to connect to an end of a pipe and align a fluid passage of the pipe with a fluid passage extending through the main fitting, the main fitting having formed therein a port opening on an exterior side of the fitting and aligned with a recess extending around an internal circumference of the fluid passage in the main fitting;

a first test slide sized and configured to be removably inserted through the port and into the recess to block the flow of fluid through the main fitting;

a second finish slide sized and configured to be inserted into the port and recess to seal the port, wherein the test slide further comprises a fluid passage having a first end opening onto an exterior surface of the slide when the slide is inserted into the port and a second end opening into the fluid passage of the main fitting when the slide is inserted into the port.

27. The pressure testing kit of claim 26, wherein the first end of the fluid passage is configured and sized to connect to an end of a garden hose.

28. A pressure testing kit for testing the pressure in a pipe line, comprising:

a main fitting having at least one end adapted to connect to an end of a pipe and align a fluid passage of the pipe with a fluid passage extending through the main fitting, the main fitting having formed therein a port opening on an exterior side of the fitting and aligned with a recess extending around an internal circumference of the fluid passage in the main fitting;

a first test slide sized and configured to be removably inserted through the port and into the recess to block the flow of fluid through the main fitting;

a second finish slide sized and configured to be inserted into the port and recess to seal the port, wherein the at least one end of the main fitting adapted to be connected to the pipe has a pressurizing connection sized and configured to connect to a fluid source, the pressurizing connection being in fluid communication with the fluid passage of the main fitting.

29. A pressure testing kit for testing the pressure in a pipe line, comprising:

a main fitting having at least one end adapted to connect to an end of a pipe and align a fluid passage of the pipe with a fluid passage extending through the main fitting, the main fitting having formed therein a port opening on an exterior side of the fitting and aligned with a recess extending around an internal circumference of the fluid passage in the main fitting;

a first test slide sized and configured to be removably inserted through the port and into the recess to block the flow of fluid through the main fitting;

a second finish slide sized and configured to be inserted into the port and recess to seal the port, wherein the main fitting has a boss extending toward a longitudinal centerline of the fitting, with the recess being formed in the boss.

30. The pressure testing kit of claim 29, wherein the boss has at least one side wall extending perpendicular to the longitudinal axis, the at least one side wall having a recess therein extending around a circumference of the flow path to receive adhesive.

31. A pressure testing kit for testing the pressure in a pipe line, comprising:

a main fitting having at least one end adapted to connect to an end of a pipe and align a fluid passage of the pipe with a fluid passage extending through the main fitting, the main fitting having formed therein a port opening on an exterior side of the fitting and aligned with a recess extending around an internal circumference of the fluid passage in the main fitting;

a first test slide sized and configured to be removably inserted through the port and into the recess to block the flow of fluid through the main fitting;

a second finish slide sized and configured to be inserted into the port and recess to seal the port, and wherein the recess has a portion sized larger than the test slide and configured to form a space between the test slide and a radially outward wall defining the recess when the test slide is inserted into the recess.

32. A pressure testing kit for testing the pressure in a pipe line, comprising:

a main fitting having at least one end adapted to connect to an end of a pipe and align a fluid passage of the pipe with a fluid passage extending through the main fitting, the main fitting having formed therein a port opening on an exterior side of the fitting and aligned with a recess extending around an internal circumference of the fluid passage in the main fitting;

a first test slide sized and configured to be removably inserted through the port and into the recess to block the flow of fluid through the main fitting;

a second finish slide sized and configured to be inserted into the port and recess to seal the port.

33. The pressure testing kit of claim 1, wherein the test slide further comprises at least one lateral seal extending perpendicular to the direction of travel of the test slide as it is removed from the port in order to seal against fluid passage out of the port across the face of the lateral seal when the lateral seal engages walls defining the port, wherein the test slide further has an edge around its periphery, with a seal located on the engage to engage a radially outward wall forming a portion of the recess and port.

34. A pressure testing kit for testing the pressure in a pipe line, comprising:
- a main fitting having at least one end adapted to connect to an end of a pipe and align a fluid passage of the pipe with a fluid passage extending through the main fitting, the main fitting having formed therein a port opening on an exterior side of the fitting and aligned with a recess extending around an internal circumference of the fluid passage in the main fitting;
- a first test slide sized and configured to be removably inserted through the port and into the recess to block the flow of fluid through the main fitting;
- a second finish slide sized and configured to be inserted into the port and recess to seal the port, wherein the port in the fitting comprises a port in an insert that is placed in a first opening in the fitting and fastened to the fitting, with a fluid-tight seal being formed between the insert and the first opening to prevent leakage of fluid from the fluid passage to the exterior of the fitting, the fitting having a second recess extending around an internal circumference of the fluid passage in the main fitting configured to receive the insert, the fluid passage extending through the insert, and the first recess into which the finish slide and test slide are inserted being formed in the insert.

35. A pressure testing kit for testing the pressure in a pipe line, comprising:
- a main fitting having at least one end adapted to connect to an end of a pipe and align a fluid passage of the pipe with a fluid passage extending through the main fitting, the main fitting having formed therein a port opening on an exterior side of the fitting and aligned with a recess extending around an internal circumference of the fluid passage in the main fitting;
- a first test slide sized and configured to be removably inserted through the port and into the recess to block the flow of fluid through the main fitting;
- a second finish slide sized and configured to be inserted into the port and recess to seal the port; and
- a removable, exteriorly-accessible cap having a fluid tight seal interposed between the cap and fitting, the cap defining a cavity into which a portion of the test slide can be removably placed, the test slide being connected to a shaft extending though the cap, the shaft being connected to a handle to move the test slide into and out of the cap, the shaft having a sealing surface configured to prevent fluid leakage from the cap along the shaft.

36. A pressure testing kit for testing the pressure in a pipe line, comprising:
- a main fitting having at least one end adapted to connect to an end of a pipe and align a fluid passage of the pipe with a fluid passage extending through the main fitting, the main fitting having formed therein a port opening on an exterior side of the fitting and aligned with a recess extending around an internal circumference of the fluid passage in the main fitting;
- a first test slide sized and configured to be removably inserted through the port and into the recess to block the flow of fluid through the main fitting;
- a second finish slide sized and configured to be inserted into the port and recess to seal the port, wherein the insert has a stop on one of the test slide or shaft configured to limit motion of the test slide to define a partially blocked flow passage through the main fitting.

37. An assembly for testing the pressure in a pipe line, comprising:
- a fitting having at least one end adapted to connect to an end of a pipe and align a fluid passage of the pipe with a fluid passage extending through the main fitting, the fitting having formed therein a port opening on an exterior side of the fitting and aligned with a recess extending around a circumference of the fluid passage in the fitting; and
- a first test slide sized and configured to be removably inserted through the port and into the recess to block the flow of fluid through the main fitting, the test slide further comprising a fluid passage having a first end opening onto an exterior surface of the slide when the slide is inserted into the port and a second end opening into the fluid passage of the fitting when the slide is inserted into the port.

38. An assembly for testing the pressure in a pipe line, comprising:
- a fitting having at least one end adapted to connect to an end of a pipe and align a fluid passage of the pipe with a fluid passage extending through the main fitting, the fitting having formed therein a port opening on an exterior side of the fitting and aligned with a recess extending around a circumference of the fluid passage in the fitting; and
- a first test slide sized and configured to be removably inserted through the port and into the recess to block the flow of fluid through the main fitting, and wherein the boss has at least one side wall extending perpendicular to the longitudinal axis, the at least one side wall having a recess therein extending around a circumference of the flow path to receive adhesive.

39. An assembly for testing the pressure in a pipe line, comprising:
- a fitting having at least one end adapted to connect to an end of a pipe and align a fluid passage of the pipe with a fluid passage extending through the main fitting, the fitting having formed therein a port opening on an exterior side of the fitting and aligned with a recess extending around a circumference of the fluid passage in the fitting;
- a first test slide sized and configured to be removably inserted through the port and into the recess to block the flow of fluid through the main fitting, wherein the test slide further comprises at least one lateral seal extending perpendicular to the direction of travel of the test slide as it is removed from the port in order to seal against fluid passage out of the port across the face of the lateral seal when the lateral seal engages walls defining the port.

40. An assembly for testing the pressure in a pipe line, comprising:
- a fitting having at least one end adapted to connect to an end of a pipe and align a fluid passage of the pipe with a fluid passage extending through the main fitting, the fitting having formed therein a port opening on an exterior side of the fitting and aligned with a recess extending around a circumference of the fluid passage in the fitting;
- a first test slide sized and configured to be removably inserted through the port and into the recess to block the flow of fluid through the main fitting, wherein the test slide further has an edge around its periphery, with a seal located on the edge to engage a radially outward wall forming a portion of the recess and port.

41. An assembly for testing the pressure in a pipe line, comprising:

a fitting having at least one end adapted to connect to an end of a pipe and align a fluid passage of the pipe with a fluid passage extending through the main fitting, the fitting having formed therein a port opening on an exterior side of the fitting and aligned with a recess extending around a circumference of the fluid passage in the fitting;

a first test slide sized and configured to be removably inserted through the port and into the recess to block the flow of fluid through the main fitting, wherein the at least one end of the fitting adapted to be connected to the pipe has a pressurizing connection sized and configured to connect to a fluid source, the pressurizing connection being in fluid communication with the fluid passage of the main fitting.

42. An assembly for testing the pressure in a pipe line, comprising:

a fitting having at least one end adapted to connect to an end of a pipe and align a fluid passage of the pipe with a fluid passage extending through the main fitting, the fitting having formed therein a port opening on an exterior side of the fitting and aligned with a recess extending around a circumference of the fluid passage in the fitting;

a first test slide sized and configured to be removably inserted through the port and into the recess to block the flow of fluid through the main fitting, and an insert placed through an opening in the fitting with a fluid tight seal between the insert and the opening in the fitting, the port being formed in the fitting insert, and the recess to receive the test slide being formed in the fitting insert.

43. An assembly for testing the pressure in a pipe line, comprising:

a fitting having at least one end adapted to connect to an end of a pipe and align a fluid passage of the pipe with a fluid passage extending through the main fitting, the fitting having formed therein a port opening on an exterior side of the fitting and aligned with a recess extending around a circumference of the fluid passage in the fitting;

a first test slide sized and configured to be removably inserted through the port and into the recess to block the flow of fluid through the main fitting, and a removable, exteriorly-accessible cap on the fitting, the cap defining a cavity into which a portion of the test slide is removably placed, the test slide being connected to a shaft extending though the cap, the shaft being connected to a handle to move the test slide into and out of the cap to removably engage the recess and seal the fluid passage through the fitting, the cap and shaft having sealing surfaces configured to prevent fluid leakage from the cap when the cap is placed on the fitting.

* * * * *